(12) United States Patent
Giannini et al.

(10) Patent No.: US 12,435,204 B2
(45) Date of Patent: Oct. 7, 2025

(54) COMPOSITIONS FOR ELASTOMERIC COMPOUNDS INCLUDING POLYTETRAZOLE CROSS-LINKING AGENTS AND TYRES COMPRISING THE SAME

(71) Applicant: Pirelli Tyre S.p.A., Milan (IT)

(72) Inventors: Luca Giannini, Milan (IT); Luciano Tadiello, Milan (IT); Antonio Papagni, Milan (IT); Mauro Monti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 647 days.

(21) Appl. No.: 17/757,909

(22) PCT Filed: Dec. 29, 2020

(86) PCT No.: PCT/IB2020/062501
§ 371 (c)(1),
(2) Date: Jun. 23, 2022

(87) PCT Pub. No.: WO2021/137143
PCT Pub. Date: Jul. 8, 2021

(65) Prior Publication Data
US 2023/0058851 A1    Feb. 23, 2023
US 2025/0230297 A2    Jul. 17, 2025

(30) Foreign Application Priority Data

Dec. 30, 2019 (IT) .......................... 102019000025804

(51) Int. Cl.
C08K 5/3472 (2006.01)
B60C 1/00 (2006.01)
C08K 3/04 (2006.01)
C08K 3/36 (2006.01)

(52) U.S. Cl.
CPC .............. *C08K 5/3472* (2013.01); *B60C 1/00* (2013.01); *C08K 3/04* (2013.01); *C08K 3/36* (2013.01)

(58) Field of Classification Search
CPC .......... C08K 5/3472; C08K 3/04; C08K 3/36; B60C 1/00
USPC ....................................................... 524/575
See application file for complete search history.

(56) References Cited

U.S. PATENT DOCUMENTS 4,196,110 A    4/1980   Abeler et al.
7,396,938 B1 *  7/2008   Irvin .................... C07D 257/04
                                                         548/250

FOREIGN PATENT DOCUMENTS

| JP | S62-263239 A | 11/1987 |
|---|---|---|
| JP | H11-29709 A | 2/1999 |
| JP | 2009-7511 A | 1/2009 |
| JP | 2017-39824 A | 2/2017 |
| KR | 20170034721 A | 3/2017 |
| TW | 201504229 A | 2/2015 |
| WO | 2009107151 A1 | 9/2009 |
| WO | 2012069335 A1 | 5/2012 |
| WO | WO 2016/174629 A1 | 11/2016 |
| WO | WO 2018/164248 A1 | 9/2018 |

OTHER PUBLICATIONS

Notification of the First Office Action issued by the China National Intellectual Property Administration on Jul. 19, 2023, in corresponding Application No. CN 202080089793.2 (7 pages).
Howlader, P. et al., "Self-sorting of Pd12 Self-assembled tetrahedral homo-chiral nano-cages with polytetrazole linkers", Acta Crystallographica Section A: Foundations and Advances, Indian Institute of Science, 2007, 1 page.
Chatang, L., Aviation powder tire tread stock formula, "Aircraft rudder tire surface limb formulation", China Academic Journal Electronic Publishing House, vol. 40, Issue 3, 1994-2022, 2004, pp. 21-27.
International Search Report form the European Patent Office in corresponding International Application No. PCT/IB2020/062501 mailed Dec. 29, 2020.
Written Opinion of the International Searching Authority from the European Patent Office in corresponding International Application No. PCT/IB2020/062501 mailed Dec. 29, 2020.
Hiltebramdt, K. et al., "Star polymer synthesis via λ-orthogonal photochemistry", The Royal Society of Chemistry, Chem Communication, vol. 52, pp. 6426-9429, 2016.
Otomo, S. et al., "Studies of Tetrazoles as Rubber Chemicals", Journal of Applied Polymer Science, vol. 28, pp. 3671-3679, 1983.
Stille, J.K. et al., "Synthesis and Copolymerization of Styryl-Substituted Tetrazoles. Thermal Cross-Linking of Copolymers Containing Diplarophiles and the Tetrazoles as Nitrile Imine Dipole Precursors", Styryl-Substituted Tetrazoles, Macromolecules, vol. 5, No. 4, 1972.
Durr, C. J., "Photo-Induced Ligation of Acrylonitrile-Butadiene Rubbber: Selective Tetrazole-Ene Coupling of Chain-End-Functionalized Copolymers of 1, 3-Butadiene", ACS Publications, Macromolecules, vol. 46, pp. 5915-5923, 2013.

\* cited by examiner

*Primary Examiner* — Deve V Hall
(74) *Attorney, Agent, or Firm* — Finnegan, Henderson, Farabow, Garrett & Dunner, L.L.P.

(57) ABSTRACT

The present invention relates to compositions for elastomeric compounds for tyres, comprising polytetrazole cross-linking compounds characterized by precise activation temperatures, tyre components and tyres for vehicle wheels which comprise them. Advantageously, the present polytetrazole cross-linking agents give lower hysteresis and retention of the modulus of the compounds even under stress.

20 Claims, 14 Drawing Sheets

7A 3.1

7B 3.2

7G 3.8

9A

9C

9B

9D

COMPOSITIONS FOR ELASTOMERIC COMPOUNDS INCLUDING POLYTETRAZOLE CROSS-LINKING AGENTS AND TYRES COMPRISING THE SAME

This application is a national stage filing under 35 U.S.C. § 371 of International Application No. PCT/IB2020/062501, filed on Dec. 29, 2020, which claims priority to Italian Patent Application No. 102019000025804, filed on Dec. 30, 2019; the contents of each application is incorporated herein by reference in their entirety.

DESCRIPTION

The present invention relates to compositions for elastomeric compounds for tyres, comprising polytetrazole cross-linking compounds characterized by precise activation temperatures, tyre components and tyres for vehicle wheels which comprise them.

PRIOR ART

In the tyre industry, sulphur cross-linking is a process commonly used to improve the mechanical properties of rubbers.

Cross-linking influences the hardness, elasticity, hysteresis of the elastomeric material and, consequently, the properties and behaviour of the tyre that incorporates it.

Over the years, various additives have been proposed to improve the cross-linking process such as cross-linking activators, accelerants and retardants.

However, even with the use of additives, conventional cross-linking systems, in particular sulphur, are not entirely satisfactory as they are not very versatile and are difficult to control, both in terms of degree and homogeneity of cross-linking and of activation temperatures, since they may give rise to scorching due to early cross-linking or providing materials with poor hysteretic properties due to the non-optimal dispersion of sulphur in the elastomeric material.

Typically, with traditional sulphur cross-linking systems, the cross-linking agent and cross-linking additives are incorporated into the compound in special mixers in one or more mixing steps downstream of the production process, at a controlled temperature, generally not greater than 130° C., preferably below 110° C., and for limited times to avoid premature triggering of the cross-linking reactions.

However, the poor solubility of sulphur in elastomeric compounds together with the mild mixing conditions adopted for its incorporation—controlled temperature and short times—mean that its dispersion is not always ideal.

For example, in the case of compounds of elastomers with different polarity, the undesired accumulation of sulphur may occur in only one of the steps to which it is more alike.

As a consequence of an unsatisfactory distribution of sulphur, the final cross-linked material may not have the desired properties, in particular it may be characterised by a marked hysteresis, i.e. show an increase in dissipated heat under dynamic conditions.

Furthermore, the breaking properties of the material, such as load and elongation, may be compromised by a non-homogeneous distribution of the vulcanising agents. Finally, the migration of some components of the vulcanisation system at the interface between different compounds may cause stiffening problems of the interfaces themselves and therefore a reduced mechanical resistance thereof. The problem appears in particular where there is contact between compounds rich in accelerants but poor in sulphur and compounds rich in sulphur and poor in accelerants, such as for example at the tread-under-layer interface.

In tyres, this translates into high rolling resistance, greater wear and fuel consumption, increased polluting emissions, higher costs and in general a useful life of the tyre lower than that potentially achievable.

Currently, the majority of vehicle manufacturers increasingly require their suppliers to develop low rolling resistance tyres to reduce consumption and environmental impact.

A possible approach to decrease the hysteresis of elastomeric materials is based on the use of special reinforcing fillers which may partially or completely replace standard fillers such as carbon black and silica and impart less hysteresis while maintaining sufficient reinforcement, as shown for example in WO2016174629A1. However, there remains the need to further reduce the rolling resistance of the tyres and therefore to produce increasingly eco-compatible tyres and at the same time increase their useful life by maximising the breaking resistance of its components.

SUMMARY OF THE INVENTION

The Applicant has undertaken studies to improve both the process and the cross-linking product of the elastomeric compounds, with the aim of having fewer constraints in operating conditions, greater versatility and possibly improving the dynamic properties of the cross-linked materials, so as to reduce the rolling resistance of the tyres comprising them.

For this purpose, the Applicant's activity has focused on alternative cross-linking systems, in particular on polytetrazole systems, which have proved to be able to react with the double bonds present in the elastomeric component of the tyre, the addition of which, in addition to simplifying and making the compound preparation process more versatile has also, unexpectedly, led to an improvement in the hysteretic properties of the same and to the reduction of the "Payne effect", i.e. the non-linearity of the dynamic behaviour of the cross-linked compound as the deformation increases.

As regards the reactivity of tetrazoles, it is known from the literature for example from J. K. Stille, A. T. Chen, Macromolecules, 378, 5, 1972, that 2,5-disubstituted tetrazoles, following heating or irradiation with ultraviolet light, evolve, with nitrogen development, generating highly reactive intermediate species (nitrilimines) able to react with double bonds (A=B), such as vinyl groups, as shown in the following Scheme 1:

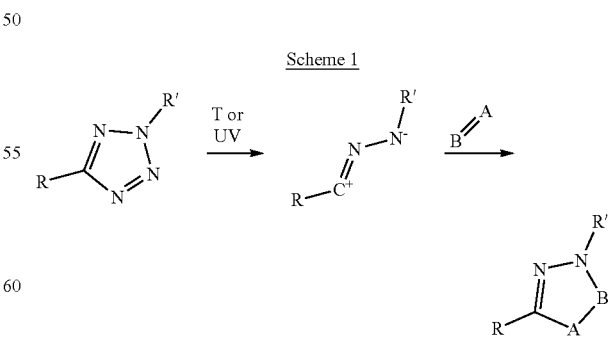

This 1,3-dipolar cyclization reaction leads to the formation of stable substituted pyrazolines, easily recognisable because they are fluorescent when exposed to ultraviolet radiation.

The temperature at which the 2,5-disubstituted tetrazole decomposes, herein also referred to as the activation temperature, depends on the nature of the groups present in the 2,5 positions of the tetrazole, as discussed for example in the article J. Appl. Polym. Science Vol. 28, 3671-3679 (1983) in Table 1, in the article Macromolecules Vol. 5, No. 4, (1972), p. 377-384, in Table 2, and as investigated by the Applicant in the present experimental part (Table 1).

To the knowledge of the Applicant, not many studies have been carried out on the use of tetrazoles, and in particular of 2,5-disubstituted tetrazoles, in applications with elastomeric materials.

Document JP2009007511A deals with an elastomeric composition for tyres, comprising a tetrazole derivative mono-substituted in position 5 of formula

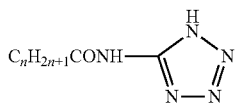

and its vulcanisation, in particular the problems caused by the poor dispersion of silica. This paper neither shows or teaches the possible thermal activation of tetrazoles at certain temperatures nor suggests the use of polytetrazole derivatives. The Applicant has experimentally verified that 5-mono-substituted tetrazoles such as these are activated at very high temperatures, higher than 220° C. (as shown by the TGA analysis of FIG. 2).

JP2017039824A discloses an elastomeric composition with improved reactivity between a silane coupling agent and rubber, comprising a molecule (D) with three or more nitrogen atoms in a ring and a sulphur atom outside the ring. The description neither suggests the use of polytetrazole derivatives nor mentions their possible thermal activation at certain temperatures. The Applicant has experimentally verified that 5-mercapto-substituted tetrazoles such as these do not decompose clearly upon heating with the release of nitrogen but degrade slowly, as shown by the thermogram of FIG. 2.

The article Macromolecules Vol. 5 p. 377-384 (1972) shows the preparation of high molecular weight synthetic elastomers which incorporate numerous tetrazole pendants into the polymer backbone. In particular it describes the copolymerization of styrenes substituted with tetrazoles, specifically of monomer 2 (Table II), with isoprene (page 380, col. on the left, last paragraph) to give the block copolymer 25, or with styrene and butadiene to give the terpolymers of Table III. According to the article, these elastomers—by heating around 200° C.—lead to materials with physical properties comparable to those of conventional SBR elastomers, normally cross-linked with sulphur and zinc oxide (page 380, col. on the right).

The authors do not present any comments or results on the dynamic properties of cross-linked materials or on the possible interactions with fillers and other additives typically present in an elastomeric compound.

The article Macromolecules Vol. 46, (2013) p. 5915-5923, describes the synthesis of high molecular weight NBR nitrile-butadiene rubbers by coupling short NBR chains terminated with a 2,5-disubstituted tetrazole on a maleidimine linker. This tetrazole is photochemically decomposed to give a nitrilimine which reacts selectively with the double bonds of the linker and not with those much more numerous of NBR.

The article neither deals with the cross-linking of these NBRs nor with the dynamic properties of cross-linked materials.

In its studies, the Applicant has found not only that certain particular polytetrazole compounds prove to be very effective, selective, versatile and modifiable ad hoc cross-linking agents for elastomers according to the specific application, but also that after cross-linking they unexpectedly improve the hysteretic properties and the linearity of the dynamic behaviour (Payne effect reduction) of the materials, with undoubted application advantages.

Therefore, a first aspect of the present invention is an elastomeric composition for tyre compounds comprising at least:
  100 phr of at least one diene elastomeric polymer (A),
  at least 0.1 phr of at least one reinforcing filler (B),
  at least 0.1 phr of at least one polytetrazole cross-linking agent (C) of formula (I)

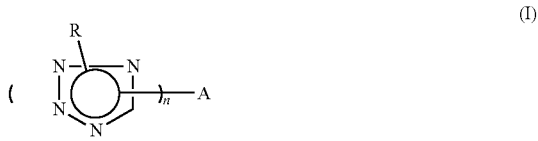

wherein
A represents an organic group (linker), possibly including one or more heteroatoms, covalently bound to n tetrazoles, equal or different from each other, where n is an integer from 2 to 10, and each of the n tetrazoles is bound to A in position 2 or 5 and is respectively substituted in position 5 or 2 with a R group selected, independently for each tetrazole, from $C_3$-$C_{10}$ linear or branched alkyl, $C_6$-$C_{20}$ aryl, $C_3$-$C_{10}$ cycloalkyl, mono or bicyclic heterocyclyl, saturated, unsaturated or aromatic, with 5 or 6-member rings comprising at least one heteroatom selected from N, S, O, possibly benzocondensed, being R in turn possibly substituted with at least one electron withdrawing group X or one electron donor group Y, said polytetrazole cross-linking agent (C) having a molecular weight lower than 10000 g/mol, and
  from 0 to 20 phr of a vulcanising agent (D).

A further aspect of the present invention is an elastomeric compound for tyres, green or at least partially cross-linked, obtained by mixing and possibly cross-linking the elastomeric composition according to the invention.

A further aspect of the present invention is a process for preparing an elastomeric compound according to the invention, which comprises:
  i) mixing, in one or more steps, all the components of the composition according to the invention keeping the temperature at a value T1 lower than the minimum activation temperature of the at least one polytetrazole cross-linking agent (C), to give a compound (I) comprising said unreacted polytetrazole cross-linking agent (C), and
  ii) possibly heating the compound (I) to a temperature T2 at least equal to or higher than the minimum activation temperature of the polytetrazole cross-linking agent (C), to give a compound (II) wherein said at least one polytetrazole cross-linking agent (C) has partially or completely reacted with the double bonds of the diene elastomeric polymer (A).

A further aspect of the present invention is a tyre component for vehicle wheels comprising, or preferably consisting of, a green or at least partially cross-linked elastomeric compound, according to the invention.

A further aspect of the present invention is a tyre for vehicle wheels comprising at least one component of a tyre according to the invention.

Surprisingly, the polytetrazole compounds (C), when incorporated and cross-linked in elastomeric compounds for tyres, give them better hysteretic properties and reduce the Payne effect.

Furthermore, the particular reactivity and versatility in the activation temperature of these cross-linking agents, depending on the type of substitution on the tetrazole ring, allow further advantages not achievable with conventional sulphur-based cross-linking agents to be obtained.

Definitions

The term "electron donor group X" means an atom or a group of atoms which contributes to increasing the electron density on nearby atoms such as —$CH_3$, —OH, —OR, —$NH_2$.

The term "electron-withdrawing group Y" means an atom or group of atoms which attracts electron charge densities from nearby atoms such as —$NO_2$, —CN, —COOH and halogens.

The term "minimum activation temperature" of the polytetrazole cross-linking agent (C) means the minimum temperature at which at least one of the tetrazoles decomposes with loss of nitrogen and formation of the intermediate nitrilimine.

The term "activation temperature" of the polytetrazole cross-linking agent (C) means the minimum activation temperature in the case of polytetrazole cross-linking agent (C) with different R substituents on the tetrazoles while it means the activation temperature common to all tetrazoles in the case of polytetrazole cross-linking agent (C) with the same R substituents on the tetrazoles.

The term "elastomeric composition for tyre compounds" means a composition comprising at least one diene elastomeric polymer and one or more additives, which by mixing and possible heating provides an elastomeric compound suitable for use in tyres and their components.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric compound" indicates the compound obtainable by mixing and possibly heating at least one elastomeric polymer with at least one of the additives commonly used in the preparation of tyre compounds.

The term "non-cross-linkable elastomeric compound" indicates the compound obtainable by mixing and possibly heating at least one elastomeric polymer with at least one of the additives commonly used in the preparation of tyre compounds, with the exception of cross-linking agents.

The term "cross-linkable elastomeric compound" indicates the elastomeric compound ready for cross-linking, obtainable by incorporation into a non-cross-linkable elastomeric compound of all the additives, including those of cross-linking.

The term "cross-linked vulcanised compound" means the material obtainable by cross-linking of a cross-linkable elastomeric compound.

The term "green" indicates a material, a compound, a composition, a component or a tyre not yet cross-linked.

The term "cross-linking" means the reaction of forming a three-dimensional lattice of inter- and intra-molecular bonds in a natural or synthetic rubber.

The term "vulcanisation" refers to the cross-linking reaction in a natural or synthetic rubber induced by a sulphur-based cross-linking agent.

The term "cross-linking agent" indicates a product capable of transforming natural or synthetic rubber into elastic and resistant material due to the formation of a three-dimensional network of inter- and intra-molecular bonds.

The term "vulcanising agent" means a sulphur-based cross-linking agent such as elemental sulphur, polymeric sulphur, sulphur donor agents such as bis [(trialkoxysilyl) propyl]polysulphides, thiurams, dithiodimorpholines and caprolactam-disulphide.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" indicates a product capable of delaying the onset of the vulcanisation reaction and/or suppressing undesired secondary reactions, for example N-(cyclohexylthio) phthalimide (CTP).

The term "vulcanisation package" is meant to indicate the vulcanising agent and one or more vulcanisation additives selected from among vulcanisation activating agents, accelerants and retardants.

The term "elastomeric polymer" indicates a natural or synthetic polymer which, after cross-linking, can be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates an elastomeric polymer derived from the polymerization of one or more monomers, of which at least one is a conjugated diene.

The term "reinforcing filler" is meant to refer to a reinforcing material typically used in the sector to improve the mechanical properties of tyre rubbers, preferably selected from among carbon black, conventional silica, such as silica from sand precipitated with strong acids, preferably amorphous, diatomaceous earth, calcium carbonate, titanium dioxide, talc, alumina, aluminosilicates, kaolin, silicate fibres and mixtures thereof.

The term "white filler" is meant to refer to a conventional reinforcing material used in the sector selected from among conventional silica and silicates, such as sepiolite, paligorskite also known as attapulgite, montmorillonite, alloisite and the like, possibly modified by acid treatment and/or derivatised. Typically, white fillers have surface hydroxyl groups.

The term "mixing step (1)" indicates the step of the preparation process of the elastomeric compound in which one or more additives can be incorporated by mixing and possibly heating, except for the vulcanising agent which is fed in step (2). The mixing step (1) is also referred to as "non-productive step". In the preparation of a compound there may be several "non-productive" mixing steps which may be indicated with 1a, 1b, etc.

The term "mixing step (2)" indicates the next step of the preparation process of the elastomeric compound in which the vulcanising agent and, possibly, the other additives of the vulcanisation package are introduced into the elastomeric compound obtained from step (1), and mixed in the material, at controlled temperature, generally at a compound temperature lower than 120° C., so as to provide the vulcanisable elastomeric compound. The mixing step (2) is also referred to as "productive step".

The term "conventional cross-linking process" means a process in which the cross-linking of the compound essentially takes place by vulcanisation with sulphur-based vulcanising agents.

For the purposes of the present description and the following claims, the term "phr" (acronym for parts per hundreds of rubber) indicates the parts by weight of a given elastomeric compound component per 100 parts by weight of the elastomeric polymer, considered net of any plasticising extension oils.

Unless otherwise indicated, all the percentages are expressed as percentages by weight.

DETAILED DESCRIPTION OF THE INVENTION

Figure 1:
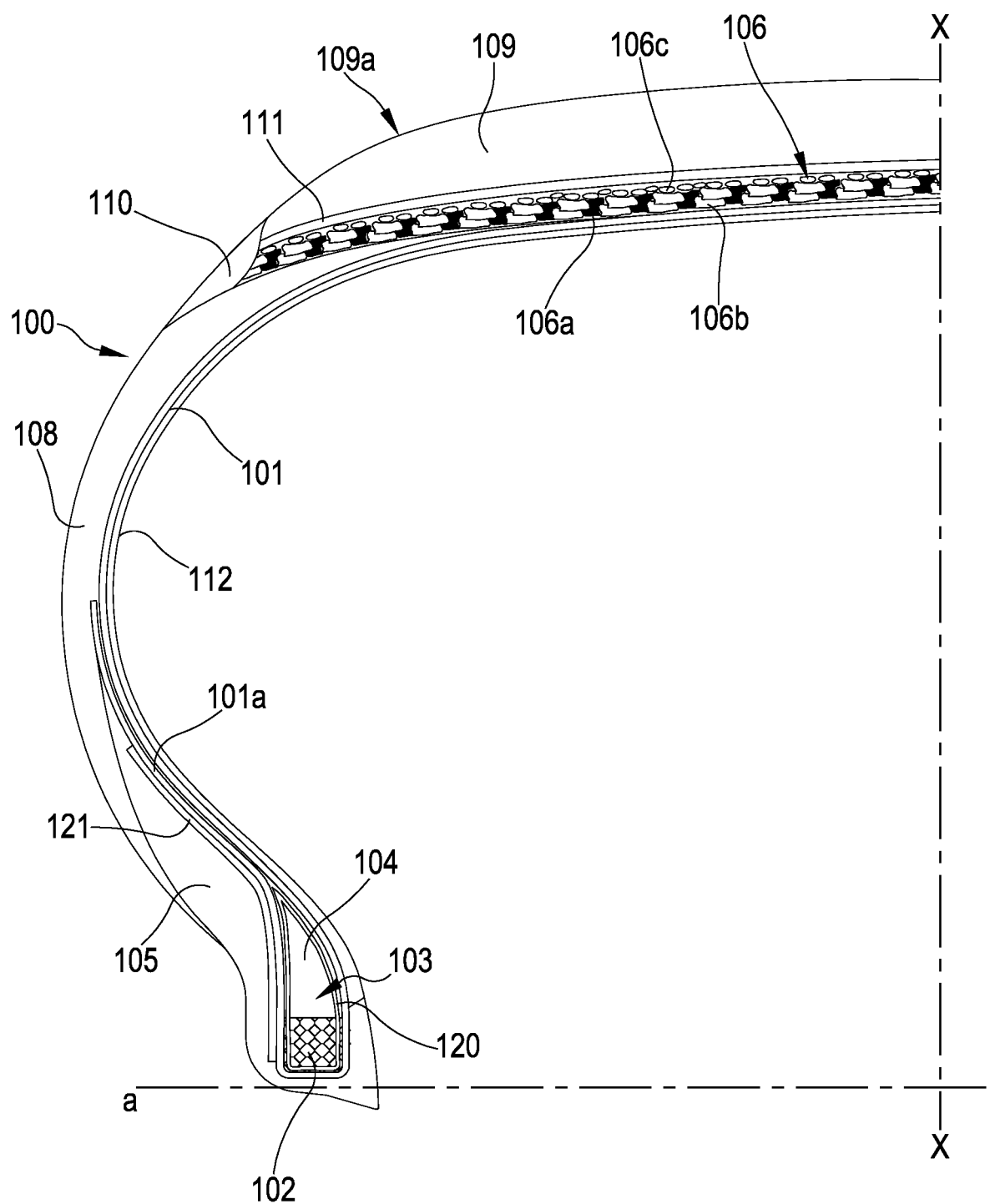
FIG. 1 schematically shows a semi-sectional view of a tyre for vehicle wheels according to the present invention.
Figure 2:
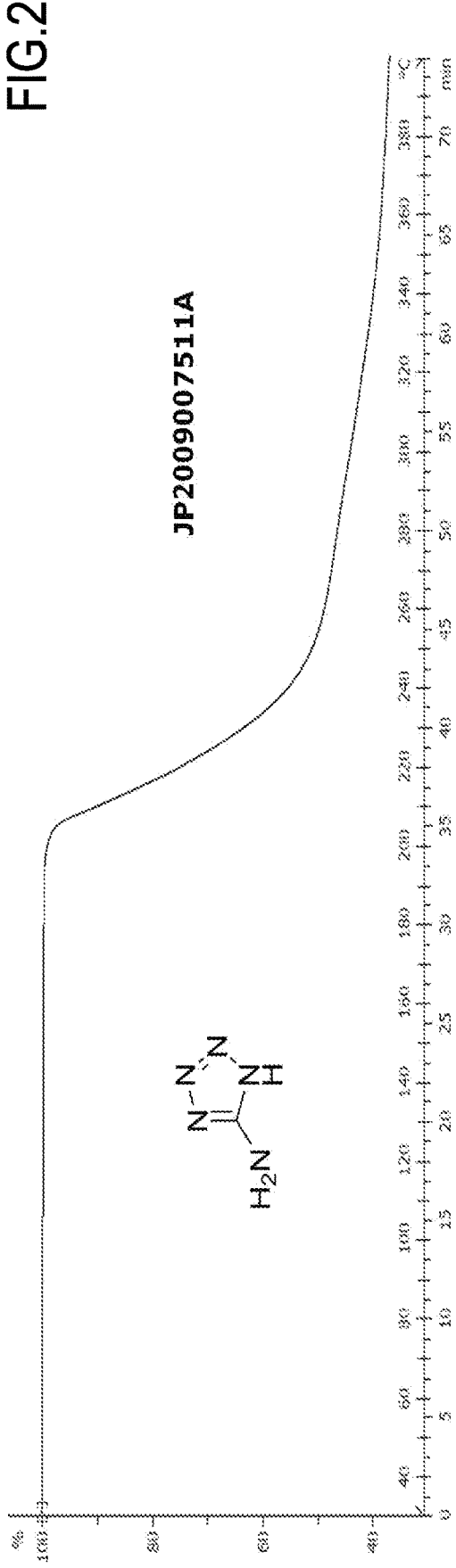
FIG. 2 shows the plots of the thermogravimetric analysis (TGA) of the tetrazole compounds shown in documents JP2009007511A and JP2017039824A.
Figure 2:
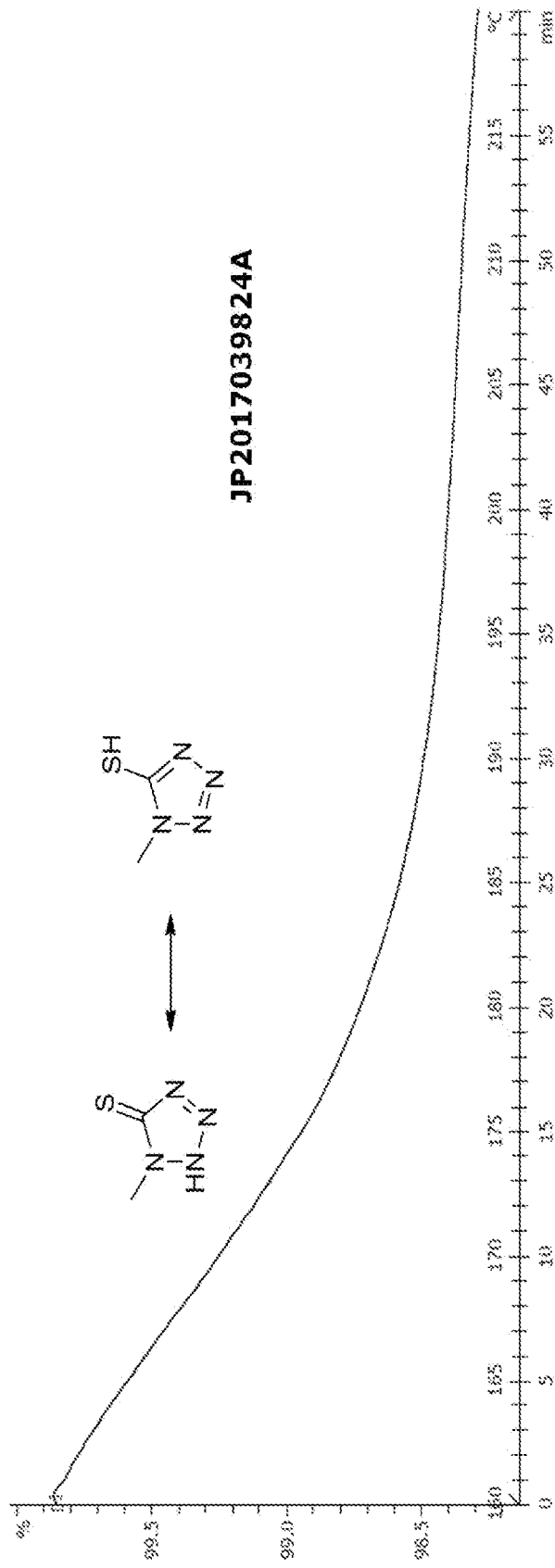

The elastomeric composition for tyre compounds according to the present invention is characterized by one or more of the following preferred aspects taken alone or in combination with one another.

The elastomeric composition according to the invention comprises 100 phr of at least one diene elastomeric polymer (A).

The diene elastomeric polymer (A) may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than 20° C., preferably in the range from 0° C. to −110° C.

These polymers or copolymers may be of natural origin or may be obtained by solution polymerization, emulsion polymerization or gas-phase polymerization of one or more conjugated dienes, optionally mixed with at least one comonomer selected from monoolefins, monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

The monoolefins can be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl) styrene, and mixtures thereof. Styrene is particularly preferred. Polar comonomers that may optionally be used, can be selected, for example, from: vinylpyridine, vinylquinoline, acrylic acid and alkylacrylic acid esters, acrylonitriles, or mixtures thereof, such as, for example, methyl acrylate, ethyl acrylate, methyl methacrylate, ethyl methacrylate, acrylonitrile and mixtures thereof.

Preferably, the diene elastomeric polymer may be selected, for example, from cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof. The elastomeric composition may possibly comprise at least one polymer of one or more monoolefins with an olefinic comonomer or derivatives thereof. The monoolefins can be selected from: ethylene and α-olefins generally containing from 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; and mixtures thereof.

The elastomeric composition for tyres according to the present invention may comprise at least 0.5 phr of at least one reinforcing filler (B).

The present composition may comprise from 1 phr to 150 phr, from 5 phr to 120 phr or from 10 phr to 90 phr of at least one reinforcing filler (B).

Preferably, the reinforcing filler (B) is selected from carbon black, white fillers, silicate fibres or mixtures thereof.

In an embodiment, said reinforcing filler (B) is a white filler selected from among hydroxides, oxides and hydrated oxides, salts and hydrated salts of metals, silicates fibres or mixtures thereof. Preferably, said white filler is silica.

Preferably, said silica may be present in the elastomeric composition in an amount ranging between 1 phr and 100 phr, more preferably between 30 phr and 70 phr. Commercial examples of suitable conventional silica are Zeosil 1165 MP from Solvay, and Ultrasil 7000 GR from Evonik.

In one embodiment, said reinforcing filler (B) is carbon black.

Preferably, said carbon black is present in the elastomeric composition in an amount ranging between 1 phr and 100 phr, preferably between 5 phr and 70 phr.

Preferably, the carbon black is selected from those having a surface area not smaller than 20 m$^2$/g, preferably larger than 50 m$^2$/g (as determined by STSA-statistical thickness surface area according to ISO 18852:2005).

The carbon black may be, for example, N234, N326, N330, N375 or N550, N660 marketed by Birla Group (India) or by Cabot Corporation.

The elastomeric composition for tyre compounds of the invention preferably comprises at least 0.5 phr, more preferably at least 1 phr of at least one polytetrazole cross-linking agent (C) of formula (I).

The elastomeric composition for tyre compounds of the invention preferably comprises no more than 30 phr, more preferably no more than 20 phr, even more preferably no more than 10 phr of at least one polytetrazole cross-linking agent (C) of formula (I).

The elastomeric composition for tyre compounds of the invention preferably comprises from 0.5 phr to 30 phr, more preferably from 1 phr to 20 phr, even more preferably from 2 phr to 10 phr of at least one polytetrazole cross-linking agent (C) of formula (I).

The elastomeric composition for tyre compounds of the invention preferably comprises at least 0.5 phr, more preferably at least 1, even more preferably at least 2 phr of at least one polytetrazole cross-linking agent (C) of formula (I).

In the polytetrazole cross-linking agent (C) of formula (I)

A is an organic group (linker) preferably selected from $C_1$-$C_{30}$ alkylene, $C_6$-$C_{20}$ arylene,
  mono or bicyclic heterocyclylene, with 5 or 6-member rings, saturated, unsaturated or aromatic, comprising at least one heteroatom selected from N, S and O, $C_1$-$C_{10}$-alkylene $C_6$-$C_{10}$-arylene $C_1$-$C_{10}$-alkylene,
  $C_1$-$C_{10}$-alkylene-$C_1$-$C_{10}$-heterocyclylene-alkylene, wherein heterocyclylene is as defined above,
  $C_6$-$C_{10}$ alkylene, $C_6$-$C_{10}$ arylene,
  heterocyclylene-heterocyclylene, wherein heterocyclylene is as defined above,
  $C_1$-$C_{10}$ alkylene-$C_6$-$C_{10}$ arylene-$C_6$-$C_{10}$ arylene $C_1$-$C_{10}$-alkylene,
  $C_1$-$C_{10}$-alkylene-$C_1$-$C_{10}$-heterocyclylene-heterocyclylene-alkylene, wherein heterocyclylene is as defined above,
  $C_6$-$C_{10}$ arylene-$C_1$-$C_{10}$ alkylene-$C_6$-$C_{10}$ arylene,
  $C_1$-$C_{10}$ heterocyclylene-alkylene-heterocyclylene, wherein heterocyclylene is as defined above,
  polyoxyethyl chains and unsaturated fragments such as polyterpenes, possibly substituted with heteroatoms (O, N).

Alkylene, arylene and heterocyclylene refer to an at least divalent radical obtained by removing at least one hydrogen atom from an alkyl, aryl and heterocyclyl group, respectively.

A may represent a $C_1$-$C_{30}$ alkylene.

The $C_1$-$C_{30}$ alkylene may be a hydrocarbon group, saturated or unsaturated, linear or branched, possibly comprising one or more heteroatoms selected from B, N, S, O, P, Si, having at least two terminal valence bonds.

The alkylene may be for example —CH$_2$—, —CH<, —(CH$_2$)$_{2-20}$—, —CH$_2$—O—CH$_2$—, —(O—CH$_2$—CH$_2$)—; —(O—CH$_2$—CH—R)—.

Preferably the alkylene is a $C_1$-$C_{20}$ alkylene, more preferably a —(CH$_2$)$_{2-10}$, even more preferably —(CH$_2$)$_{2-8}$.

The alkylene may be a group —(CH$_2$—CH=CH—)$_m$, wherein m is preferably an integer from 1 to 100, derived from the polymerisation of one or more unsaturated monomers of which at least one is a conjugated diene to give an oligomer.

Preferably, the oligomer derives from the polymerization of one or more monomers selected from butadiene, isoprene, ocimene, farnesene or myrcene.

Preferably, the oligomer has a molecular weight lower than 8000 g/mol, more preferably between 1000 and 8000 g/mol.

In the oligomer two or more hydrogens, up to a maximum of 10, are substituted with a group comprising a 2,5-disubstituted tetrazole, to give the polytetrazole cross-linking compound (C).

In particular, the polytetrazole cross-linking compound (C) may derive from the polymerisation of one or more monomers of which at least one is bound in position 5 or 2 of a tetrazole, the other position 2 or 5 of the same tetrazole being suitably substituted with a group R as defined herein.

An example of an oligomer thus prepared is the polymerisation product of styrene and butadiene, wherein a part of the styrene monomer is a styrene substituted by a tetrazole, as illustrated in the following Scheme 2:

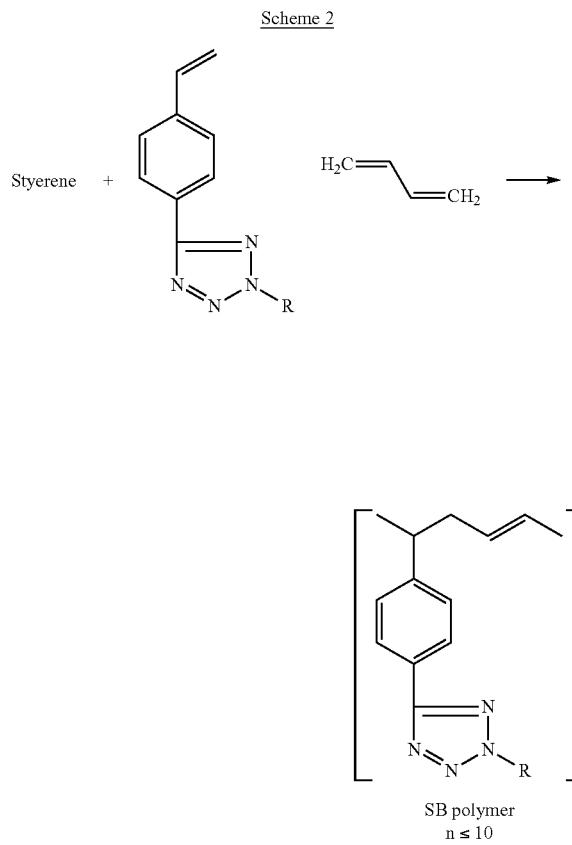

Alternatively, the polytetrazole cross-linking compound (C) may derive from the polymerisation of one or more unsaturated monomers, of which at least one is a conjugated diene, and of which at least one is substituted with a Z group on which it is possible to construct the tetrazole a posteriori, i.e. after polymerisation, according to known reactions. The precursor group Z of tetrazole may be for example —CN, CHO, $H_2N-C=NH$.

An example of an oligomer thus prepared is the polymerisation product of styrene and butadiene, wherein a part of the styrene monomer is a styrene substituted by a cyano group, as illustrated in the following Scheme 3:

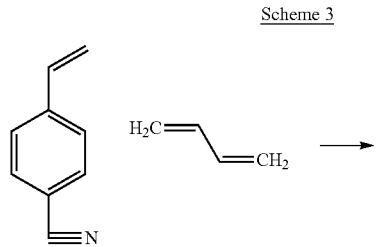

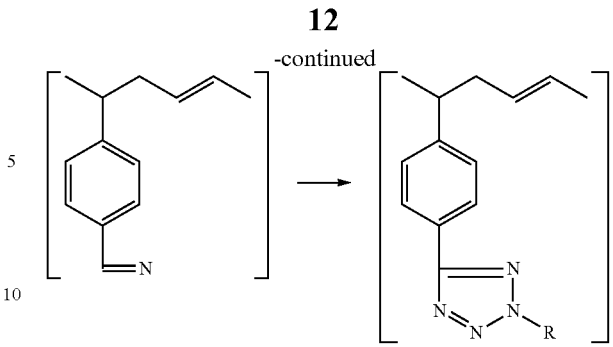

Another example of polytetrazole compounds (C) are the elastomeric oligomers obtainable by converting from 2 to 10 cyano groups, per molecule of acrylonitrile-butadiene oligomer (NBR), into 2-substituted tetrazoles.

Advantageously, these cross-linking polytetrazole elastomeric oligomers (C) are characterized by a good solubility in the elastomeric matrix unlike the classic sulphur-based cross-linking agents.

A may represent a $C_6$-$C_{20}$ arylene.

$C_6$-$C_{20}$ arylene comprises carbocyclic, mono and polycyclic aromatic ring systems, in which the single carbocyclic rings are fused or attached to each other via a single bond.

$C_6$-$C_{20}$ arylene may be for example phenylene, biphenylene, naphthylene, fluorenylene, phenanthrylene, para-alkoxy phenylene, meta-chloro phenylene.

Preferably, the arylene is phenylene.

A may represent a heterocyclylene.

Heterocyclylene includes heteroarylene as well as the dihydro and tetrahydro analogues thereof. The binding sites of heterocyclylene may be a carbon atom or a heteroatom.

Heterocyclylene may be derived from a heterocycle such as pyrrole, dihydropyrrole, pyrrolidine, furan, dihydrofuran, tetrahydrofuran, benzofuran, isobenzofuran, dihydrobenzofuran, thiophene, dihydrothiophene, tetrahydrothiophene, benzothiophene, thiazolezole, dihydrothiazole, dihydrothiazole, benzotriazole, tetrazole, dihydrotetrazole, isothiazole, dihydroisothiazole, imidazole, benzoimidazole, dihydroimidazole, dihydrobenzoimidazole, oxazole, dihydrooxazole, benzoxazole, dihydrobenzoxazole, oxazoline, isoxazole, dihydroisooxazole, isoxazoline, oxadiazole, pyrazole, benzopyrazole, dihydropyrazole, pyridine, dihydropyridine, piperidine, piperazine, pyrazine, pyridazine y-pyran, tetrahydropyran, dihydropyran, 1,4-dioxane, benzo-1,4-dioxane, morpholine, thiomorpholine pyrazine, dihydropyrazine, pyrazoline, quinoline, isoquinoline dihydroquinoline, tetrahydroisoidquinoline, indole, dihydroindoloindole, dihydroindole, quinazoline, quinoxaline and the like. Preferably, heterocyclylene derives from a heterocycle selected from thiophene, dithiophene, oligothiophene, benzothiophene pyrrole, oligopyrrole.

Alkylene, arylene and heterocyclylene may optionally be substituted by $C_1$-$C_{20}$ alkylene groups, more preferably —$(CH_2)_{2-10}$ groups, oxo-alkylene-O—$C_1$-$C_{20}$ groups, amino-alkylene $N(C_1$-$C_{20})_2$, $C(O)C_1$-$C_{20}$ acyl groups or the corresponding esters and amides.

In the polytetrazole cross-linking agent (C) of formula (I), preferably n is an integer from 2 to 4, more preferably n is selected from 2 to 3.

In the polytetrazole cross-linking agent (C) of formula (I), preferably R is $C_1$-$C_5$ alkyl, $C_6$-$C_{10}$ aryl, $C_3$-$C_7$ cycloalkyl, heterocyclyl defined as heteroclylene of group A.

R may be for example phenyl, 4-hydroxyphenyl, 4-carboxyphenyl, 3,5-dimethylphenyl, 3,5-dimethoxyphenyl, 4-octyloxyphenyl, 4-phenyl-1,2,4-triazolidine-3,5-dione, 1-hexyl, 2-thiophenyl, 5-amino-2-thiophenyl, dithiophenyl, diphenyl, tertiophenyl; oligo-2,5-thiophenyl (with a number of thiophenes from 1-4) also substituted in position 3,4 with ($C_1$-$C_{20}$) alkyl or ($C_1$-$C_{20}$) alkoxy chains, naphthalene- and anthracenic-based benzofused aromatic polycyclic systems bearing alkyl and alkoxy chains in the positions not occupied by the tetrazole unit. To increase the solubility of the polytetrazole cross-linking agent (C) in the elastomeric matrix, R may be selected from the more lipophilic groups such as 4-hexyl-phenyl, naphthalenyl, fluorenyl and the like.

The group R of each tetrazole may be independently substituted by at least one electron-withdrawing group X.

The electron-withdrawing group X may for example be selected from halogen, carbonyl (—CO—R), carboxyl, ester, cyano, nitro, haloalkyl, sulphonyl ($SO_2$).

It may be advantageous to select electron-withdrawing groups traceable with suitable analytical techniques, such as nuclear magnetic resonance, even when the polytetrazole cross-linking agent (C) which contains it is diluted in the elastomeric compound, such as fluorinated groups.

The group R of each tetrazole may be independently substituted by at least one electron-donor group Y.

The electron donor group Y may for example be selected from hydroxy, $C_1$-$C_{10}$ alkyl, $C_1$-$C_{10}$ alkyl, amino, amino monosubstituted with $C_1$-$C_{10}$ alkyl, amino disubstituted with $C_1$-$C_{10}$ alkyl, primary amide (—NH—COR), hydrazonyl (CH=N—$NR_2$) and the like. In one embodiment, all the n tetrazoles of the polytetrazole cross-linking agent (C) have the same group R. In this case, all the tetrazoles will decompose at the same activation temperature, which corresponds to the minimum activation temperature of the polytetrazole cross-linking agent (C).

In one embodiment, the n tetrazoles of the polytetrazole cross-linking agent (C) do not all have the same group R. In this case, the differently substituted tetrazoles may decompose at different T, starting to react at a first temperature called minimum activation temperature and completing cross-linking upon reaching one or more higher T's.

Advantageously, these cross-linking agents are capable of anchoring themselves to the polymeric matrix, without diffusing outside the matrix, and then cross-linking at a later time.

In one embodiment, the polytetrazole cross-linking agent (C) has a molecular weight of less than 1500 g/mol, preferably less than 1000 g/mol.

In a preferred embodiment, the polytetrazole cross-linking agent (C) of formula (I) comprises two tetrazoles (n=2), i.e. it is a compound of formula (I-A)

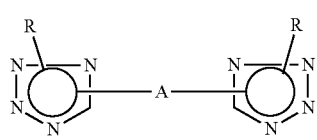
(I-A)

to which the definitions and variables previously indicated for the compounds of formula (I) apply.

In a preferred embodiment, the compound of formula (I-A) has the two tetrazoles substituted with the same substituent R.

In a preferred embodiment, the compound of formula (I-A) has the two tetrazoles bonded to A in position 2 and substituted in position 5 with the same substituent R, i.e. the polytetrazole cross-linking agent is a compound of formula (I-B)

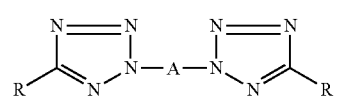
(I-B)

Specific examples of compounds of formula (I-B) are the compounds:

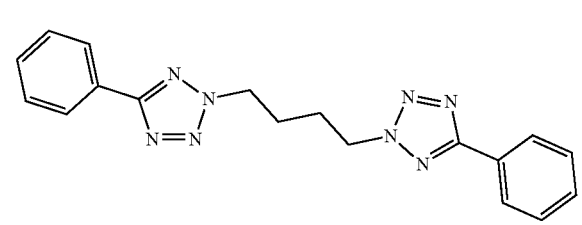

wherein R=phenyl and A=—($CH_2$)$_4$—

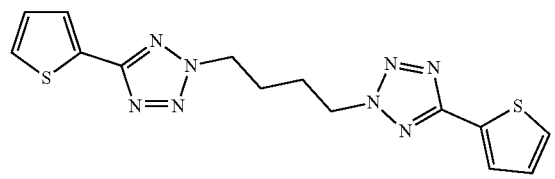

wherein R=2-thiophenyl and A=—($CH_2$)$_4$—

In a preferred embodiment, the compound of formula (I-A) has the two tetrazoles bonded to A in position 5 and substituted in position 2 with the same substituent R, i.e. the polytetrazole cross-linking agent is a compound of formula (I-C)

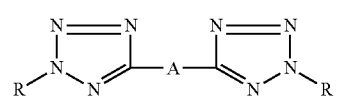
(I-C)

Specific examples of compounds of formula (I-C) are the compounds:

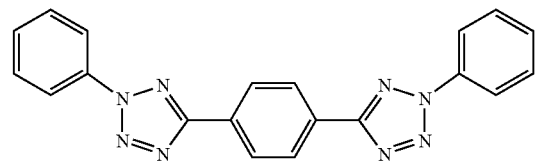

wherein R=phenyl and A=1,4-phenylene

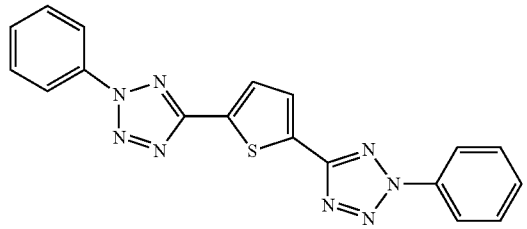

wherein R=phenyl and A=2,5-thiophenylene

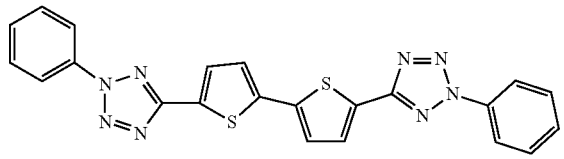

wherein R=phenyl and A=5,5'-bis-2,2'-bithiophene.

In a preferred embodiment, the polytetrazole cross-linking agent (C) of formula (I) comprises three tetrazoles (n=3), i.e. it is a compound of formula (I-D)

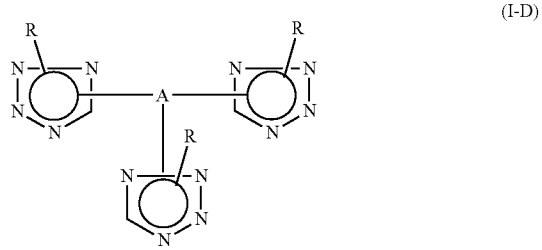

(I-D)

to which the definitions and variables previously indicated for the compounds of formula (I) apply.

Specific example of a polytetrazole of formula (ID) is the compound:

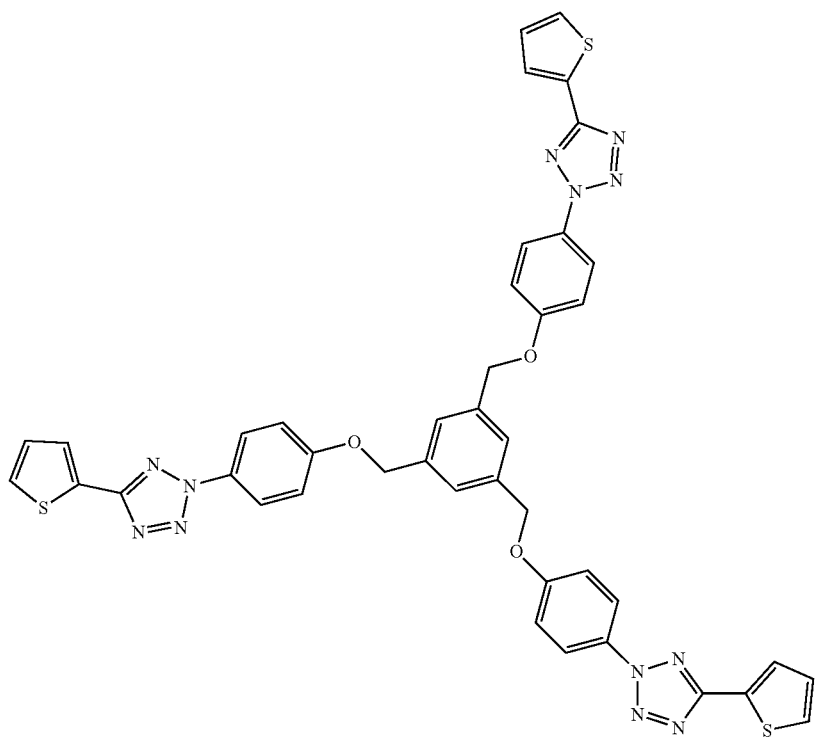 [SMILES: c1csc(-c2nnn(-c3ccc(OCc4cc(COc5ccc(-n6nnc(-c7cccs7)n6)cc5)cc(COc5ccc(-n6nnc(-c7cccs7)n6)cc5)c4)cc3)n2)c1]

In a preferred embodiment, the polytetrazole cross-linking agent (C) of formula (I) comprises four tetrazoles (n=4), such as for example the following compound:

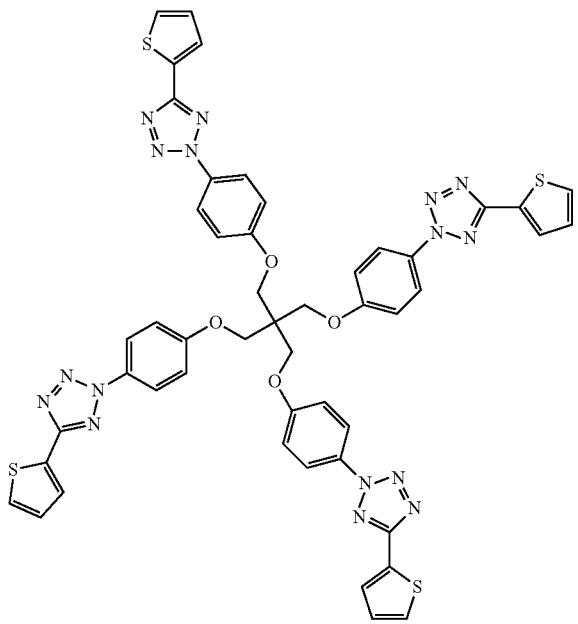 [SMILES: c1csc(-c2nnn(-c3ccc(OCC(COc4ccc(-n5nnc(-c6cccs6)n5)cc4)(COc4ccc(-n5nnc(-c6cccs6)n5)cc4)COc4ccc(-n5nnc(-c6cccs6)n5)cc4)cc3)n2)c1]

In one embodiment, the polytetrazole cross-linking agent (C) has a molecular weight preferably lower than 5000 g/mol, more preferably lower than 2000 g/mol, even more preferably lower than 1000 g/mol.

By appropriately selecting the organic group A, the group R and its possible at least one electron-withdrawing X or electron-donor Y substituent group, it is possible to modulate ad hoc both the activation temperature of the polytetrazole cross-linking agent (C) and its solubility in the selected elastomeric matrix.

Preferably, the polytetrazole cross-linking agent (C) has an activation temperature not lower than 100° C., more preferably not lower than 120° C.

The polytetrazole cross-linking agent (C) with an activation temperature lower than 100° C. is not preferred since it could give rise to cross-linking reactions too early, already during the mixing steps of the components prior to vulcanisation. The early cross-linking would make the compound difficult to process, both in the steps of unloading from the internal mixer and in the extrusion procedures of the semi-finished products, also compromising the integrity of the finished tyre due to the fragility of the material.

In one embodiment, the polytetrazole cross-linking agent (C) preferably has an activation temperature not greater than 220° C., more preferably not greater than 210° C., even more preferably lower than 200° C.

In one embodiment, the polytetrazole cross-linking agent (C) has an activation temperature between 190° C. and 220° C., so as not to decompose if subjected to the conventional sulphur vulcanisation conditions (temperature indicatively from 140° C. to 170° C.), remaining unchanged in the final vulcanised compound.

Preferably, the polytetrazole cross-linking agent (C) has an activation temperature not lower than 100° C., more preferably not lower than 120° C. and not greater than 220° C., more preferably not greater than 200° C.

Depending on the specific application, the polytetrazole cross-linking agent (C) may have a lower activation temperature, similar to or higher than the vulcanisation temperature of a conventional sulphur-based cross-linking agent possibly present in the compound, typically between 140° C. and 170° C., with possible advantages for both materials and preparation processes.

In the event that the present polytetrazole cross-linking agent (C) is the only cross-linking agent present in the composition, it may be selected on the basis of, for example, the low activation temperature and the high liposolubility, to allow a good dispersion in the elastomeric mass and subsequent cross-linking in energy saving conditions. Advantageously, the cross-linking with the present polytetrazole cross-linking agent (C) makes the cross-linked material less hysteretic and improves the linearity of the dynamic response of the material (reduced Payne effect).

Wanting to improve the dispersion of the present polytetrazole cross-linking agent (C) in the elastomeric material, it is possible to select one having a higher activation temperature, thus being able to proceed with prolonged hot mixing steps without running the risk of triggering the cross-linking prematurely and thus burning the compound.

On the other hand, in the case in which in the composition in addition to the present polytetrazole cross-linking agent (C) there is also a vulcanising agent based on sulphur, different applications may be implemented according to the activation temperature of the present polytetrazole cross-linking agent (C).

A lower activation temperature, for example between 100° C. and 130° C., allows the compound to be partially pre-cross-linked, increasing its viscosity in a controlled manner before conventional vulcanisation. In this case, the mixing steps will be carried out at a controlled T, not higher than the activation T itself.

An activation temperature similar to that of vulcanisation, for example between 130° C. and 170° C., allows the compound to be cross-linked with both cross-linking systems (conventional sulphur-based and according to the invention with the present polytetrazole compounds) in a single step, increasing the cross-linking and making it more uniform.

In both previous cases, the cross-linking with the present polytetrazole cross-linking agent (C) advantageously makes the final cross-linked material less hysteretic. On the other hand, a higher activation temperature, for example from 170° C. up to 220° C. or 230° C., allows proceeding with the conventional preparation steps without having to strictly control the T, except to avoid premature vulcanisation of the compound by sulphur (mixing T preferably lower than 120° C.).

In particular, such a high activation temperature makes it possible to prepare an elastomeric compound already vulcanised with sulphur but at the same time still capable of cross-linking when, for example, subjected to particularly stressful conditions of use, with overheating beyond that specific activation temperature. In this way, it is possible to remedy the degradation of the material under stress thanks to the formation of new bonds originating from the reaction of the polytetrazole cross-linking agent (C) during the use of the tyre.

The polytetrazole cross-linking agent (C) of formula (I) may be prepared according to one or more conventional synthesis schemes such as those described for example in J. Appl. Polym. Science Vol. 28, 3671-3679 (1983), in Macromolecules Vol. 5, No. 4, (1972), p. 377-384, in Chem. Commun. 2016, 52, 9426, or like those reported in the present experimental part.

The elastomeric composition for tyre compounds according to the invention may comprise from 0.1 to 10 phr of a vulcanising agent (D).

Preferably, the composition comprises at least 0.2 phr, 0.5 phr, 0.8 phr or 1 phr of at least one vulcanising agent (D).

Preferably, the composition comprises from 0.1 to 10 phr, from 0.2 to 10 phr, from 1 to 10 phr or from 1.5 to 5 phr of at least one vulcanising agent (D).

The at least one vulcanising agent (D) is preferably selected from sulphur, or alternatively, sulphur-containing molecules (sulphur donors), such as for example bis(trialcoxysilyl)propyl]polysulphides and mixtures thereof.

Preferably, the vulcanising agent (D) is sulphur, preferably selected from soluble sulphur (crystalline sulphur), insoluble sulphur (polymeric sulphur), (iii) oil-dispersed sulphur and mixtures thereof.

Commercial example of vulcanising agent (D) suitable for use in the elastomeric composition of the invention is the Redball Superfine sulphur of International sulphur Inc.

In the present elastomeric composition, the vulcanising agent (D) may be used together with adjuvants such as vulcanisation activators, accelerants and/or retardants known to those skilled in the art.

The elastomeric composition according to the invention may optionally comprise at least one vulcanisation activator.

The vulcanisation activating agents suitable for use in the present elastomeric composition are zinc compounds, in particular ZnO, $ZnCO_3$, zinc salts of saturated or unsaturated fatty acids containing from 8 to 18 carbon atoms, which are preferably formed in situ in the elastomeric composition by reaction of ZnO and of the fatty acid, as well as $Bi_2O_3$, PbO, $Pb_3O_4$, $PbO_2$, or mixtures thereof. For example, zinc stearate is used, preferably formed in situ in the elastomeric composition, by ZnO and fatty acid, or magnesium stearate, formed by MgO, or mixtures thereof. The vulcanisation activating agents may be present in the elastomeric composition of the invention in amounts preferably from 0.2 phr to 15 phr, more preferably from 1 phr to 5 phr.

Preferred activating agents derive from the reaction of zinc oxide and stearic acid. An example of activator is the product Aktiplast ST marketed by Rheinchemie. The elastomeric composition according to the invention may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition are N-cyclohexyl-2-benzothiazyl-sulphenamide Vulkacit® (CBS or CZ), and N-terbutyl 2-benzothiazil sulphenamide, Vulkacit® NZ/EGC marketed by Lanxess.

Vulcanisation accelerants may be used in the present elastomeric composition in an amount preferably from 0.05 phr to 10 phr, preferably from 0.1 phr to 7 phr, more preferably from 0.5 phr to 5 phr.

The elastomeric composition according to the invention may optionally comprise at least one vulcanisation retardant agent.

The vulcanisation retardant agent suitable for use in the present elastomeric composition is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of preferably from 0.05 phr to 2 phr.

The present elastomeric composition may comprise one or more vulcanisation retardant agents as defined above in a mixture.

The elastomeric composition according to the invention may further comprise at least 0.05 phr, preferably at least 0.1 phr or 0.5 phr, more preferably at least 1 phr or 2 phr of at least one silane coupling agent.

Preferably, the elastomeric composition according to the invention comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which can be identified, for example, by the following general formula (III):

$$(R')_3Si—C_nH_{2n}—X \qquad (III)$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitroso, mercapto, amino, epoxide, vinyl, imide, chloro, —$(S)_mC_nH_{2n}$—Si—$(R')_3$ and —S—COR', wherein m and n are integers of from 1 to 6 and the groups R' are as defined above.

Particularly preferred silane coupling agents are bis(3-triethoxysilylpropyl)tetrasulphide and bis(3-triethoxysilylpropyl)disulphide. Said coupling agents may be added as such or in mixture with an inert filler (such as carbon black) so as to facilitate their incorporation into the elastomeric composition.

An example of the silane coupling agent is TESPT: bis(3-triethoxysilylpropyl)tetrasulphide Si69 marketed by Evonik.

The elastomeric composition according to the invention may further comprise one or more additional ingredients, commonly used in the field, such as for example conventional reinforcing fillers, activating agents, vulcanisation accelerants and retardants, plasticising oils, resins, antioxidant and/or antiozonating agents (anti-aging agents), waxes, adhesives and the like.

For example, the elastomeric composition according to the present invention, in order to further improve the workability of the compound, may further comprise at least one plasticising oil.

The amount of plasticiser is preferably from 1 phr to 80 phr, preferably from 10 phr to 70 phr, more preferably from 30 phr to 50 phr.

The term "plasticising oil" means a process oil derived from petroleum or a mineral oil or a vegetable oil or a synthetic oil or combinations thereof.

The plasticising oil may be a process oil derived from petroleum selected from paraffins (saturated hydrocarbons), naphthenes, aromatic polycyclic and mixtures thereof.

Examples of suitable process oils derived from petroleum are aromatic, paraffinic, naphthenic oils such as MES (Mild Exctract Solvated), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The elastomeric composition according to the present invention may further comprise at least one resin.

The resin, if used in the composition, is a non-reactive resin, preferably selected from the group comprising hydrocarbon resins, phenolic resins, natural resins and mixtures thereof.

The amount of resin may be from 0 phr to 80 phr, preferably from 10 phr to 40 phr.

The elastomeric composition according to the invention may optionally comprise at least one wax.

The wax may be for example a petroleum wax or a mixture of paraffins.

Commercial examples of suitable waxes are the Repsol N-paraffin mixture and the Antilux® 654 microcrystalline wax from Rhein Chemie.

The wax may be present in the elastomeric composition of the invention in an overall amount generally from 0.1 phr to 20 phr, preferably from 0.5 phr to 10 phr, more preferably from 1 phr to 5 phr.

The elastomeric composition according to the invention may optionally comprise at least one antioxidant agent.

The antioxidant agent is preferably selected from N-isopropyl-N'-phenyl-p-phenylenediamine (IPPD), N-(-1,3-dimethyl-butyl)-n'-phenyl-p-phenylenediamine (6PPD), N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like and mixtures thereof, preferably it is N-1,3-dimethylbutyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition in an overall amount preferably from 0.1 phr to 20 phr, preferably from 0.5 phr to 10 phr.

A further aspect of the present invention is an elastomeric compound for tyres, green or at least partially cross-linked, obtained by mixing and possibly cross-linking the elastomeric composition according to the invention.

The elastomeric compound according to the invention may be consolidated by cross-linking only with the polytetrazole cross-linking agent (C), if for example it does not contain the vulcanising agent (D), by vulcanisation only with the vulcanising agent (D), if the polytetrazole cross-linking agent (C) has a minimum activation temperature above the vulcanisation T and remains unreacted in the final compound, or with both, if it contains a vulcanising agent (D) and the minimum activation temperature of the polytetrazole cross-linking agent is less than or equal to the vulcanisation T.

A further aspect of the present invention is a process for preparing an elastomeric compound according to the invention.

The process for preparing the elastomeric compound according to the invention preferably comprises:
i) mixing, in one or more steps, all the components of the composition according to the invention keeping the temperature at a value T1 lower by at least 10° C. than the minimum activation temperature of the at least one polytetrazole cross-linking agent (C), to give a compound (I) comprising said unreacted polytetrazole cross-linking agent (C), and
ii) possibly heating the compound (I) to a temperature T2 at least equal to or higher than the minimum activation temperature of the polytetrazole cross-linking agent (C), to give a compound (II) wherein said at least one polytetrazole cross-linking agent (C) has partially or completely reacted with the double bonds of the diene elastomeric polymer (A).

Depending on the presence or absence of the vulcanising agent (D) and the activation temperature of the polytetrazole cross-linking agent (C), different processes may be carried out.

In one embodiment, in which the vulcanising agent (D) is absent, the process preferably comprises step ii) of heating the compound (I) to a temperature T2 at least equal to or greater than the minimum activation temperature of the polytetrazole cross-linking agent (C), to give a cross-linked compound (II). This step ii) may be carried out in a conventional vulcanisation mould.

In another embodiment, in which the vulcanising agent (D) is instead present and the minimum activation temperature of the polytetrazole cross-linking agent (C) is lower than or equal to the vulcanisation T, the cross-linking is carried out, first or during vulcanisation, by heating the compound (I) to a temperature T2 at least equal to or greater than the minimum activation temperature of the polytetrazole cross-linking agent (C) (step ii), to give a cross-linked and vulcanised compound (II).

In another embodiment, in which the vulcanising agent (D) is present and the minimum activation temperature of the polytetrazole cross-linking agent (C) is greater than the vulcanisation T, the vulcanisation is carried out but not the cross-linking through the polytetrazole agent (avoiding step ii), to give a vulcanised compound (II) comprising the unreacted polytetrazole cross-linking agent (C).

This compound, suitably incorporated in tyre components, for example in the tread, may undergo cross-linking and, therefore, further consolidation when the temperature of the tyre in use reaches the minimum activation temperature of the polytetrazole cross-linking agent (C).

The present elastomeric compound may be prepared according to a process which typically comprises one or more mixing steps in at least one suitable mixer, in particular at least one mixing step 1 (non-productive) and a mixing step 2 (productive) as defined above.

Each mixing step may comprise several intermediate processing steps or sub-steps, characterised by the momentary interruption of the mixing to allow the addition of one or more ingredients but without intermediate discharge of the compound.

The mixing may be carried out, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

The temperatures during the mixing steps and sub-steps may be set according to the minimum activation temperature of the polytetrazole cross-linking agent (C) and the moment of the process in which the cross-linking is to take place.

As previously discussed, the elastomeric composition may comprise, in addition to the polytetrazole cross-linking agent (C) also a vulcanising agent (D).

The polytetrazole cross-linking agent (C) may be incorporated in one or more of the steps 1 or 2 while the vulcanising agent (D), if present, only in the non-productive step 2.

The elastomeric compound may be cross-linked using the polytetrazole cross-linking agent (C) alone, the vulcanising agent (D) alone or both. The cross-linking obtained by using the polytetrazole cross-linking agent (C) may be carried out at a temperature lower than, equal to or greater than the vulcanisation temperature of the vulcanising agent (D).

The elastomeric compounds listed above, when they include the vulcanising agent (D), may be vulcanised according to known techniques. To this end, after one or more thermomechanical processing steps, the vulcanising agent (D) is incorporated in the materials, preferably together with vulcanisation accelerants and/or retardants. In the final treatment step (production step 2), the temperature is generally kept below 120° C. and preferably below 100° C., so as to prevent any undesired pre-vulcanisation phenomena. Thereafter, the vulcanisable compound is incorporated in one or more components of the tyre and subjected to vulcanisation, according to known techniques.

A further aspect of the present invention is a tyre component for vehicle wheels comprising, or preferably consisting of, a green or at least partially cross-linked elastomeric compound, according to the invention, preferably selected from the tread band, under-layer, anti-abrasive layer, sidewall, sidewall insert, mini-sidewall, liner, under-liner, rubber layers, bead filler, bead reinforcing layers (flipper), bead protection layers (chafer), sheet.

The tyre component may comprise or preferably may consist, of an elastomeric compound according to the invention, not cross-linked and not vulcanised (green component), of an elastomeric compound according to the invention, not cross-linked but vulcanised or not vulcanised but cross-linked (partially cross-linked component) or of a cross-linked and vulcanised elastomeric compound according to the invention (fully cross-linked component).

A further aspect of the present invention is a tyre for vehicle wheels comprising at least one of the components according to the invention indicated above. Preferably, the tyre for vehicle wheels of the invention comprises at least one tyre component consisting of an elastomeric compound according to the invention that is not cross-linked and not vulcanised (green component), of an elastomeric compound according to the invention that is not cross-linked but vulcanised or not vulcanised but cross-linked (partially cross-linked component) or of an elastomeric compound according to the invention cross-linked and vulcanised (fully cross-linked component).

Preferably, said component is a tread band.

In one embodiment, a tyre for vehicles according to the present invention comprises at least a carcass structure comprising at least a carcass ply having opposite lateral edges associated to respective bead structure;

possibly a pair of sidewalls applied to the lateral surfaces of the carcass structure, respectively, in an axially outer position;

possibly a belt structure applied in radially outer position with respect to the carcass structure;

a tread band applied in a radially outer position to said carcass structure or, if present, a belt structure, possibly a layer of elastomeric material, referred to as under-layer, applied in a radially inner position with respect to said tread band, wherein at least one component, preferably the tread band or the rubber coating of the at least one carcass layer comprises, or preferably consists of, the elastomeric compound according to the invention.

In one embodiment, the tyre according to the invention is a tyre for high performance vehicles (HP, SUV and UHP), wherein at least one component, preferably selected from under-layer, sheet, rubber coatings, sidewall and tread band, comprises, or preferably consists of, the elastomeric compound according to the invention.

In one embodiment, the tyre according to the invention is a tyre for cars, preferably for high performance.

In one embodiment, the tyre according to the invention is a tyre for motorcycles, wherein at least one component comprises, or preferably consists of, the elastomeric compound according to the invention.

The tyre according to the invention may be a tyre for two, three or four-wheeled vehicles.

The tyre according to the invention can be for summer or winter use or for all seasons.

In a preferred embodiment, the tyre according to the invention is a tyre for motorcycle wheels, preferably for sports or racing motorcycles.

In one embodiment, the tyre according to the invention is a tyre for bicycle wheels.

A tyre for bicycle wheels typically comprises a carcass structure turned around a pair of bead cores at the beads and a tread band arranged in a radially outer position with respect to the carcass structure. Preferably, at least the tread band comprises the elastomeric compound according to the invention.

The tyre according to the present invention can be produced according to a process which comprises:
  building components of a green tyre on at least one forming drum;
  shaping, moulding and vulcanising the tyre;
  wherein building at least one of the components of a green tyre comprises:
  manufacturing at least one green component comprising, or preferably consisting of, the vulcanisable elastomeric compound of the invention.

DESCRIPTION OF A TYRE ACCORDING TO THE INVENTION

A tyre for vehicle wheels according to the invention, comprising at least one component comprising the present elastomeric compound, is illustrated in radial half-section in FIG. 1.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

Tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords, such as rayon, nylon, polyester (for example polyethylene naphthalate, PEN). Each bead structure is associated to the carcass structure by folding back of the opposite lateral edges of the at least one carcass layer (101) around the annular anchoring structure (102) so as to form the so-called carcass flaps (101a) as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive strip (105) possibly made with elastomeric material is arranged in an outer position of each bead structure (103).

The carcass structure is associated to a belt structure (106) comprising one or more belt layers (106a), (106b) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

At least one zero-degree reinforcing layer (106c), commonly known as a "0° belt", may be applied in a radially outermost position to the belt layers (106a), (106b), which generally incorporates a plurality of elongated reinforcing elements, typically metallic or textile cords, oriented in a substantially circumferential direction, thus forming an angle of a few degrees (such as an angle of between about 0° and) 6° with respect to a direction parallel to the equatorial plane of the tyre, and coated with an elastomeric material.

A tread band (109) comprising the elastomeric compound according to the invention is applied in a position radially outer to the belt structure (106).

Moreover, respective sidewalls (108) of elastomeric material are applied in an axially outer position on the lateral surfaces of the carcass structure, each extending from one of the lateral edges of tread (109) at the respective bead structure (103).

In a radially outer position, the tread band (109) has a rolling surface (109a) intended to come in contact with the ground. Circumferential grooves, which are connected by transverse notches (not shown in FIG. 1) so as to define a plurality of blocks of various shapes and sizes distributed over the rolling surface (109a), are generally made on this surface (109a), which for simplicity is represented smooth in FIG. 1.

An under-layer (111) of elastomeric material can be arranged between the belt structure (106) and the tread band (109).

A strip consisting of elastomeric material (110), commonly known as "mini-sidewall", can optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

In the case of tubeless tyres, a rubber layer (112), generally known as "liner", which provides the necessary impermeability to the inflation air of the tyre, can also be provided in a radially inner position with respect to the carcass layer (101).

The rigidity of the tyre sidewall (108) can be improved by providing the bead structure (103) with a reinforcing layer (120) generally known as flipper or additional strip-like insert.

Flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103).

Flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

Chafer (121) usually comprises a plurality of cords incorporated within a rubber layer of elastomeric material. Such cords are generally made of textile materials (such as aramide or rayon) or metal materials (such as steel cords).

A layer or sheet of elastomeric material can be arranged between the belt structure and the carcass structure. The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer of elastomeric material, referred to as under-layer, can be placed between said belt structure and said tread band, said under-layer preferably extending on a surface substantially corresponding to the extension surface of said belt structure.

The elastomeric compound according to the present invention may be advantageously incorporated into one or more of the tyre components mentioned above, preferably in the tread band, in the sidewall insert, in the sheets and in the rubber compounds.

According to an embodiment not shown, the tyre may be a tyre for motorcycle wheels which is typically a tyre that has a straight section featuring a high tread camber.

According to an embodiment not shown, the tyre may be a tyre for bicycle wheels. The building of the tyre (100) as described above, can be carried out by assembling respective semi-finished products adapted to form the components of the tyre, on a forming drum, not shown, by at least one assembling device.

At least a part of the components intended to form the carcass structure of the tyre can be built and/or assembled on the forming drum. More particularly, the forming drum is intended to first receive the possible liner, and then the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After the building of the green tyre, a moulding and vulcanisation treatment is generally carried out in order to determine the structural stabilisation of the tyre through cross-linking of the elastomeric compositions, as well as to impart a desired tread pattern on the tread band and at any distinguishing graphic signs at the sidewalls.

Experimental Part

Methods of Analysis

Thermogravimetric Analysis (TGA)

The thermal behaviour of the 2,5-disubstituted tetrazoles described herein was studied by thermogravimetric analysis, under the following conditions: Model: Mettler Toledo STARe system.

The tests were carried out in two ways:

1) Determination of the activation temperature: about 10 mg of pure tetrazole vulcanising agent were inserted into the TGA crucible using a thermal program from 30° C. to 400° C. with a ramp of 5°/min. under $N_2$ flow.

The first weight loss step coincided, as a rule, with the loss of one molecule of nitrogen per tetrazole. The temperature at which the release of nitrogen from the tetrazole began was considered the activation temperature of the tetrazole-based cross-linking agent.

2) Determination of polymer reactivity: about 1 mg of pure tetrazole vulcanising agent was dispersed in about 10 mg of Polyvest 130 butadiene oligomer and the mixture placed in the TGA crucible using a thermal program from 30° C. to 140° C. (ramp 10°/min.), followed by isotherm at 140° C. for 30 min., cooling to 30° C. (ramp −10°/min.), heating from 30° C. to 90° C. (5°/min.), cooling to 30° C., heating to 170° C. (5°/min.) and isotherm of 30' at 170° C. This method was used to simulate the thermal history of an elastomeric compound and evaluate the risk of pre-vulcanisation from the weight loss of tetrazole due to decomposition.

Swelling Tests

Swelling tests in the presence of solvent were carried out on green and cross-linked compound samples to verify the effect of tetrazole cross-linking on the swelling of the compound caused by the solvent.

Swelling tests were possible on the green compound as the filler was present in such an amount as to form a physical gel so that the rubber was not soluble in the solvent since its mobility was limited by the filler (in this regard see for example B. Meissner, Rubber Chemistry and Technology, 1995, vol. 68, p. 298).

A weighed sample (about 400 mg) of the compound was immersed in 10 ml of toluene and left to soak away from light and heat. The solvent was changed to fresh toluene every 24 h. After 72 h the solvent was removed and the solvent-swollen compound gel was weighed. The gel was dried in an oven and weighed. The % swelling was expressed as the ratio of the weight of the swollen gel to the weight of the dried gel.

Measurement of Dynamic Mechanical Rheological Properties of Elastomeric Compounds (RPA)

The dynamic mechanical properties were evaluated using a Monsanto R.P.A. 2000 rheometer according to the following method: cylindrical test samples with weight from 4.5 g to 5.5 g were prepared by punching the first-step elastomeric compounds (compounds containing the polytetrazole cross-linking agent (C) but without vulcanising and co-vulcanising agents), green and cross-linked, second-step (comprising all components including vulcanising and co-vulcanising agents) final green and vulcanised.

The samples of the first and second step compounds were cross-linked in the rheometer at 190° C. for 30'; the samples of the second-step compounds were also subjected to double cross-linking in the rheometer: first at 150° C. for 40' and then at 190° C. for 30'.

The samples of the first-step compounds and the final green and cross-linked compounds were subjected to the measurement of the dynamic properties: dynamic elastic shear modulus G', dynamic viscous shear modulus G" and consequently of the tan delta (ratio G'/G") vs % deformation at 70° C., frequency 10 Hz, in the deformation range between 0.1% and 100% for samples not yet subjected to thermal cycles above 130° C. and between 0.1% and 10% deformation for samples subjected to at least one thermal cycle above 130° C.

Measurement of Static Mechanical Properties

The elastomeric materials prepared in the previous examples were vulcanised to give specimens on which the evaluation of the static mechanical properties was carried out.

Unless otherwise indicated, vulcanisation was carried out in a mould, in hydraulic press at 190° C. and at a pressure of 200 bar for about 30 minutes.

The static mechanical properties were measured at 23° C. according to the ISO 37:2005 standard.

In particular, the load at different elongation levels (10%, 50%, 100% and 300%, called CA0.1; CA0.5; CA1 and CA3) and the elongation at break CR on samples of the elastomeric materials mentioned above was measured.

The tensile tests were carried out on straight axis Dumbell specimens.

NMR

The NMR spectra were acquired with a Bruker 400 instrument. The samples were prepared by dissolving 5-10 mg of tetrazole in 0.6 ml of deuterated solvent (Chloroform or DMSO)

IR

The IR spectra were acquired with a Perkin-Elmer spectrum 100 (FT-IR) instrument. The sample was loaded directly onto the crystal and pressed with a metal tip. The spectrum was recorded in ATR (Attenuated Total Reflection) mode Example 1

Study of the Thermal Stability of 2,5-Disubstituted Monotetrazoles

The 2,5-disubstituted monotetrazoles of formula 1.1-1.25 are shown in the following Table 1:

TABLE 1

| Compound n. | Formula | Activation T ° C. |
|---|---|---|
| 1.1 | 4-(2-phenyl-2H-tetrazol-5-yl)benzoic acid | 210 |
| 1.2 | 4-(4-(2-phenyl-2H-tetrazol-5-yl)phenyl)-1,2,4-triazolidine-3,5-dione | 200 |
| 1.3 | 2-phenyl-5-(thiophen-2-yl)-2H-tetrazole | 150 |
| 1.4 | 5-(5-bromothiophen-2-yl)-2-phenyl-2H-tetrazole | 150 |
| 1.5 | 5-(2-phenyl-2H-tetrazol-5-yl)thiophen-2-amine | 165 |
| 1.6 | (5-(2-phenyl-2H-tetrazol-5-yl)thiophen-2-yl)boronic acid | 140 |
| 1.7 | 2,5-diphenyl-2H-tetrazole | 170 |
| 1.8 | 4-(5-phenyl-2H-tetrazol-2-yl)phenol | 150 |
| 1.9 | 4-(5-phenyl-2H-tetrazol-2-yl)benzoic acid | 180 |
| 1.10 | 2-(3,5-dimethylphenyl)-5-phenyl-2H-tetrazole | 165 |

TABLE 1-continued
| Compound n. | Formula | Activation T ° C. |
|---|---|---|
| 1.11 | 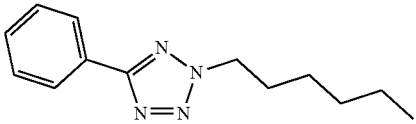 [SMILES: CCCCCCn1nnc(-c2ccccc2)n1] | 150 |
| 1.12 | 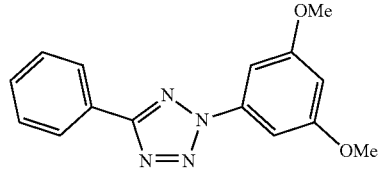 [SMILES: COc1cc(OC)cc(-n2nnc(-c3ccccc3)n2)c1] | 160 |
| 1.13 | 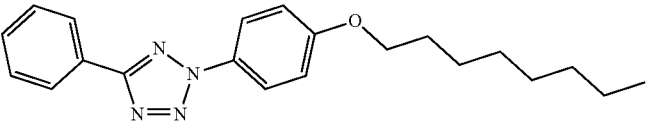 [SMILES: CCCCCCCCOc1ccc(-n2nnc(-c3ccccc3)n2)cc1] | 180 |
| 1.14 | 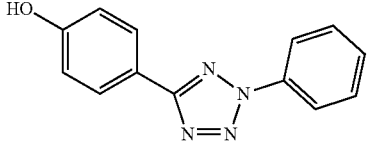 [SMILES: Oc1ccc(-c2nnn(-c3ccccc3)n2)cc1] | 190 |
| 1.15 | 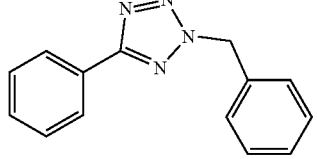 | 200 |
| 1.16 | 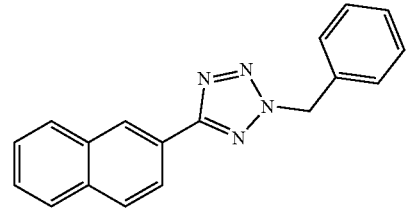 [SMILES: c1ccc(Cn2nnc(-c3ccc4ccccc4c3)n2)cc1] | 220 |
| 1.17 | 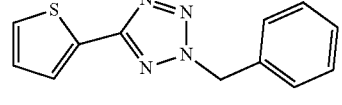 | 210 |
| 1.18 | 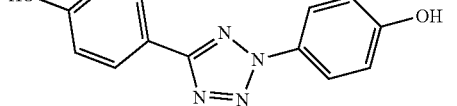 | 180 |
| 1.19 | 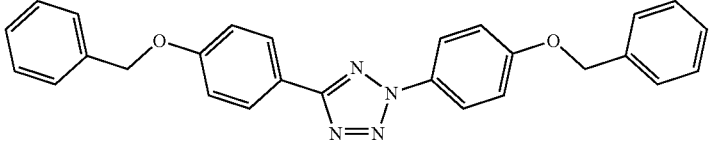 [SMILES: c1ccc(COc2ccc(-c3nnn(-c4ccc(OCc5ccccc5)cc4)n3)cc2)cc1] | 250 |

TABLE 1-continued

| Compound n. | Formula | Activation T ° C. |
|---|---|---|
| 1.20 | | 170 |
| 1.21 | | 200 |
| 1.22 | | 180 |
| 1.23 | | 190 |
| 1.24 | | 150 |
| 1.25 | | 100 | were synthesised and then analysed by thermogravimetric analysis, in order to investigate the effect of the substituent groups present in position 2 and 5 on the activation temperature of tetrazole, Synthesis of 2,5-Disubstituted Monotetrazoles with Aromatic Rings The tetrazole compounds having a phenyl in position 2 and an aromatic group optionally substituted in position 5, were prepared as described in Chem. Commun. (2016), 52, 9426, according to the following synthesis scheme 4 (herein exemplified for derivatives in which the aromatic group in 5 is a phenyl but similarly applicable to derivatives in which said group is another aromatic system):

Scheme 4

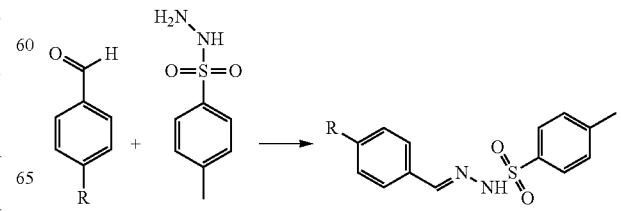

-continued

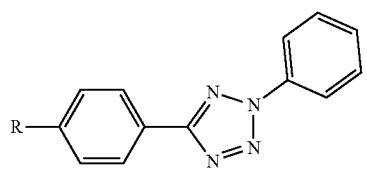

As reported in the literature, the synthesis included two steps:
The aromatic aldehyde (1 eq.) was dissolved in ethanol. Tosylhydrazide (1 eq.) was added and stirred for 4 h at reflux. Water was then added, then the precipitate formed was recovered by filtration. The product thus obtained was used for the second step without further purification.
The solid obtained in step 1 (1 eq.) was dissolved in pyridine to give solution A. In parallel, solution B was prepared by adding a solution of NaNO2 (1 eq.) in water to a cooled solution of aniline (1 eq.), conc. HCl and water/ethanol (1:1). Solution B, cooled with an ice bath, was added slowly to solution A by dropping and at the end of the addition it was stirred overnight at room temperature. Subsequently, the reaction mixture was neutralised with diluted HCl, recovering the precipitate formed by filtration. The reaction crude was purified by means of a chromatographic column or crystallized from a suitable solvent according to the type of tetrazole.

Alternatively, the compounds could be prepared by coupling reactions (see the synthesis reported in Scheme 7 relating to compound 3.3).

Thermogravimetric Analysis

The 2,5-disubstituted monotetrazoles shown in Table 1 were subjected to thermogravimetric analysis according to the method described above.

Figure 3:
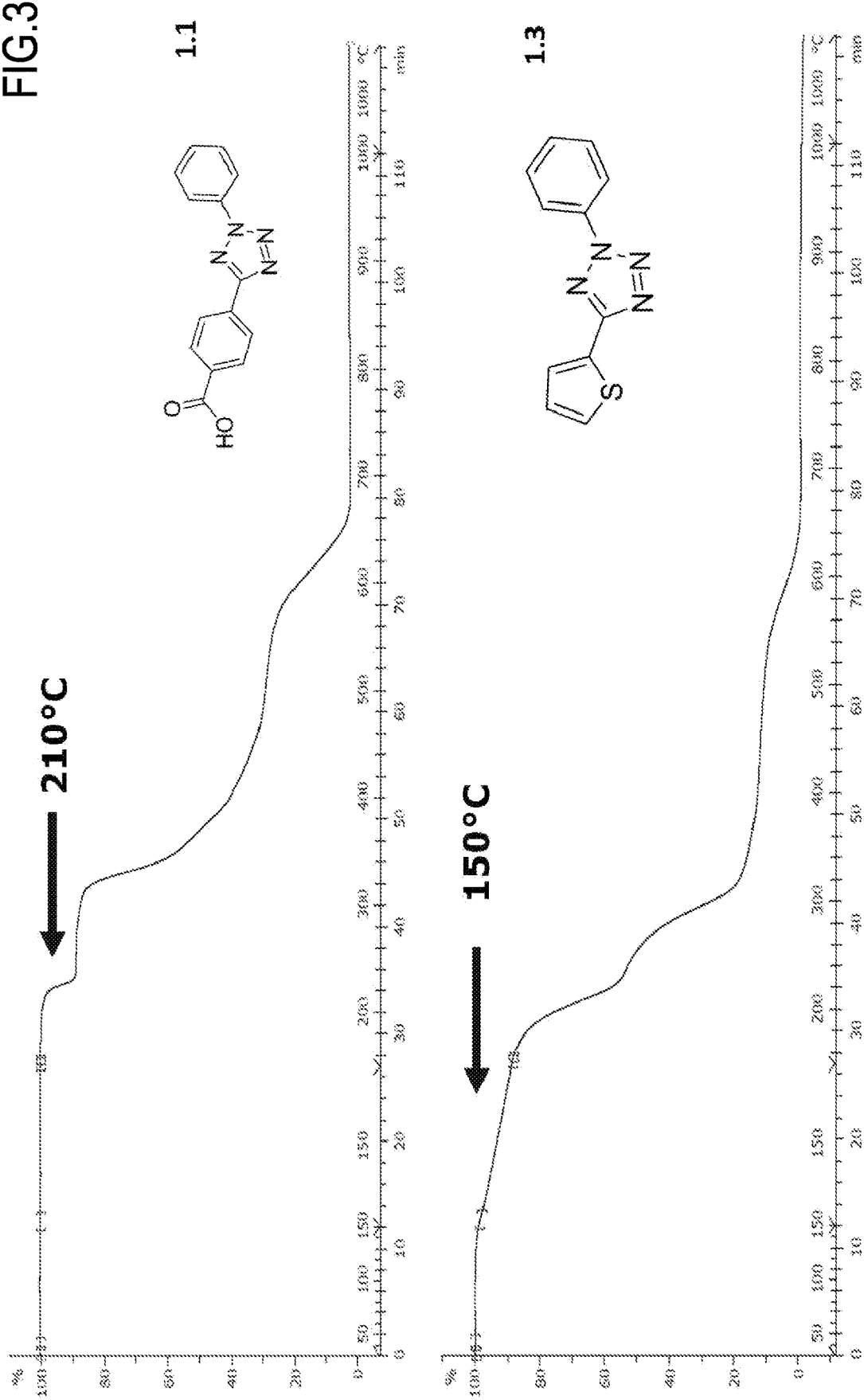
FIG. 3 shows the plots of the thermogravimetric analysis (TGA) of the 2,5-disubstituted tetrazole compounds 1.1 and 1.3.

FIG. 3 shows by way of example the plots obtained in the TGA of compounds 1.1 and 1.3. As can be seen, compound 1.1 showed a net jump around 210° C. upon the decomposition of the tetrazole ring with release of nitrogen. Compound 1.3 instead gave rise to a more gradual decomposition starting from about 150° C.

As shown in Table 1, the activation temperature of these derivatives was between 14° and 220° C. and was influenced by the nature of the substituent groups present in position 2 and 5.

In particular, it was observed that electron withdrawing groups, such as for example carboxyl or triazolidinedione (compounds 1.1 and 1.2), if present in the para position of a phenyl bonded to the carbon of the tetrazole ring, stabilised the tetrazole by increasing the activation temperature, while the electron donor groups such as thiophene, possibly substituted with amino or boronic acid (compounds 1.3-1.5) when bound to the carbon of the tetrazole ring had the opposite effect.

From the values of activation temperature reported in Table 1 it appeared that tetrazoles with decomposition T included within a wide range of temperatures of technological interest were synthetically obtainable.

By suitably combining the substituents on the tetrazole it was therefore possible to adapt the activation temperature of the system to the desired application.

Example 2

Cyclo-Addition Tests with Unsaturated Polymers

To verify the reactivity of the 2,5-disubstituted monotetrazole compounds towards the double bonds of polymers, represented in the case of terminal vinyls in the following scheme:

Scheme 5

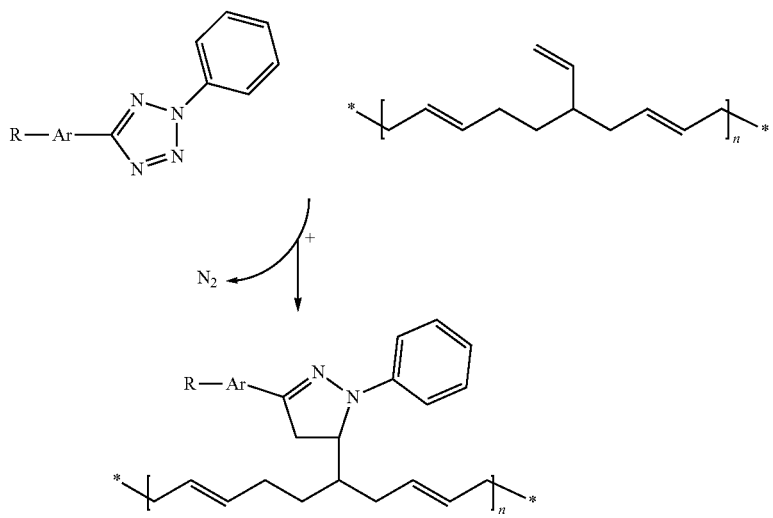

cyclo-addition tests were carried out with the compounds of Table 1, as described in the following Examples 2a, 2b and 2c.

Example 2a: the selected tetrazole derivative and the Polyvest 130S oligomer (tetrazole/polymer ratio 1:100 in moles, tetrazole/polymer vinyl groups ratio 1:1) were mixed in a glass test tube, in the absence of solvent, and the mixture was heated for 15-30 minutes to the tetrazole activation temperature.

For these preliminary cyclo-addition tests useful for evaluating the reactivity of 2,5-disubstituted tetrazoles towards the reactive double bonds of elastomers, Polyvest 130S was selected because, being liquid, it was easy to mix even without using solvent.

The formation of pyrazoline from cyclo-addition was highlighted by fluorescence under UV light (365 nm) of the samples and confirmed by the IR and NMR spectra measured at the end of the reaction on the oligomer modified with tetrazole and after having precipitated it in ethanol. The oligomer was subsequently suspended in ethanol and centrifuged (repeating this process 3 times) to remove the unreacted tetrazole and by-products.

Figure 4:
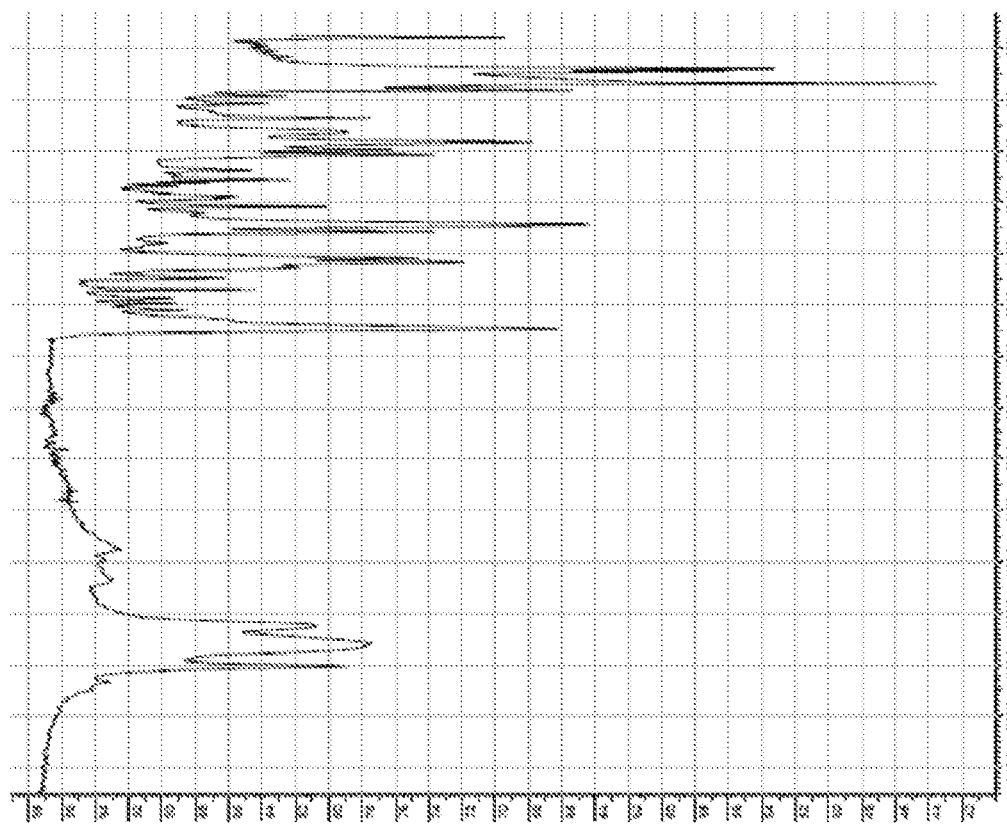
FIG. 4 shows the IR spectrum of Polyvest (4A) and its reaction product with the tetrazole compound 1.1 (4B)
Figure 4:
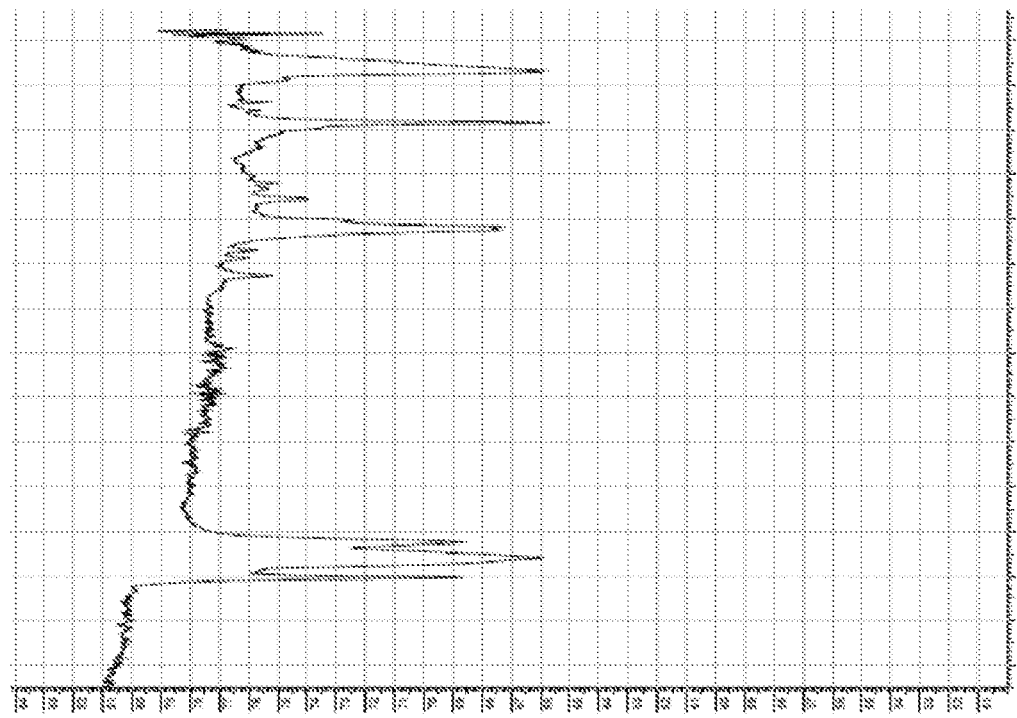

FIG. 4 shows the IR spectra of the Polyvest 130S and of the reaction product between the monotetrazole compound 1.1 and the Polyvest 130S measured with the Perkin-Elmer spectrum 100 (FT-IR) apparatus.

Figure 5:
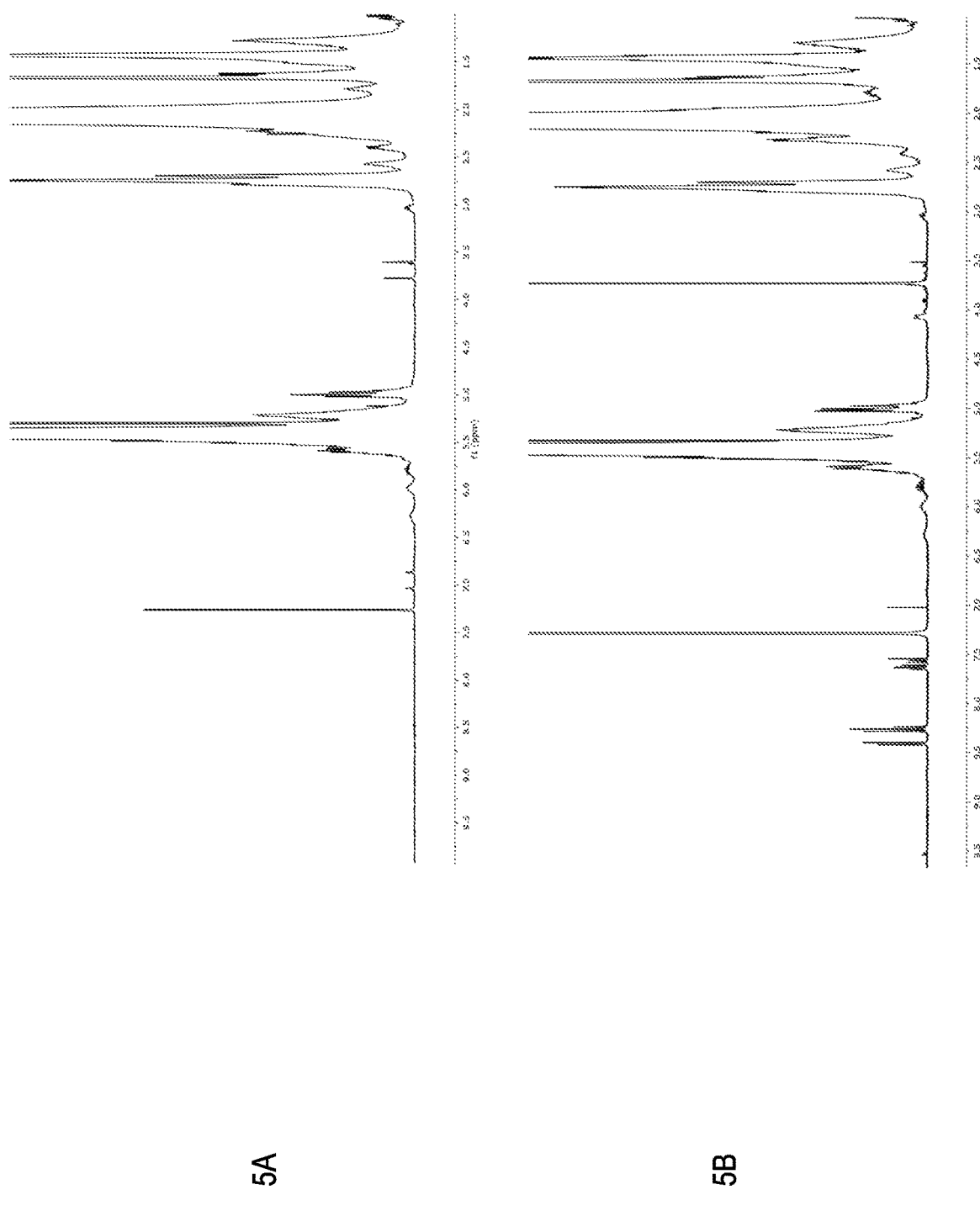
FIG. 5 shows the H-NMR spectrum of the Polyvest before (5A) and after (5B) the cyclo-addition reaction with the 2,5-disubstituted tetrazole compound 1.1.

FIG. 5 shows the H-NMR spectrum of the Polyvest before (FIG. 5A) and after (FIG. 5B) the cyclo-addition reaction with the tetrazole compound 1.1.

In the 1H-NMR spectrum after the reaction (FIG. 5B) new signals can be seen compared to those of the Polyvest, attributable to the formation of pyrazoline, in particular the signals around 9.5 ppm (carboxyl proton), those between 8.5 and 8.0 ppm (phenyl protons) and those around 4 ppm (pyrazoline ring protons).

From the tests and analyses conducted in this example, it was shown that the tetrazole had actually reacted with the double bonds, providing the corresponding pyrazoline, thus functionalising the Polyvest.

Example 2b: the selected monotetrazole derivative and the Polyvest 130S oligomer were mixed in a vial, heating to 70° C. to make the oligomer more fluid and better disperse the tetrazole. A part of the mixture was then placed in the crucible of the thermogravimeter.

The mixture was heated in TGA up to a T higher than the tetrazole activation temperature by at least 20° C. with a heating ramp that led from 70° C. to the final T in 5 minutes, then maintaining this temperature for at least other 5 minutes.

Figure 6:
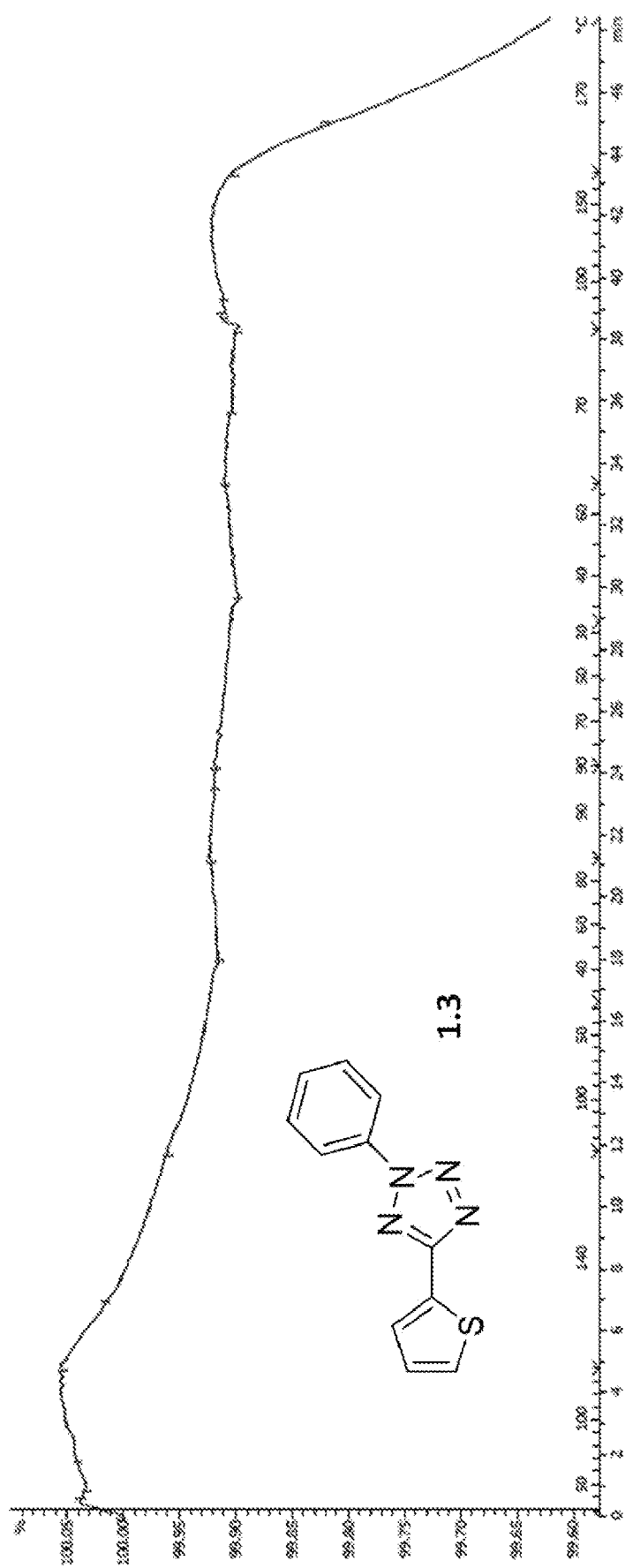
FIG. 6 shows the plot of the thermogravimetric analysis (TGA) of a sample comprising a mixture of Polyvest and the 2,5-disubstituted tetrazole compound 1.3.

FIG. 6 shows the rapid decrease in the weight of the sample comprising compound 1.3 at temperatures above its activation temperature of 150° C.

Example 2c: Another way of heating the Polyvest 130S—2,5-disubstituted monotetrazole 1.3 mixture in TGA was also tested which reproduced the thermal steps to which the elastomeric compound is typically subjected under normal tyre production conditions, comprising in succession: a first heating to 140° C. for 30 minutes, corresponding to an initial mixing step in the absence of cross-linking agent, a cooling to 40° C., a heating to 90° C. for 30 minutes, corresponding to the mixing productive step with incorporation of the cross-linking agent, a second cooling to 30° C. and finally a heating that mimics the cross-linking conditions with T increasing up to at least 20° C. above the activation temperature of the tetrazole. It was shown that tetrazole 1.3 can remain unchanged for the entire thermal cycle of processing of the compound to activate only when the activation T is reached and exceeded, as shown by the only weight loss detectable by TGA.

Example 3

Synthesis of Polytetrazole Cross-Linking Agents (C)

The polytetrazole derivatives of formula (I) reported in the following Table 2 were synthesised and characterised:

TABLE 2

| | polytetrazole cross-linking agents | | | |
|---|---|---|---|---|
| no. | Formula (I) | Brute formula | MW g/mol | att. T ° C. |
| 3.1 | | $C_{20}H_{14}N_8$ | 366.38 | 185 |
| 3.2 | | $C_{18}H_{12}N_8S$ | 372.41 | 170 |
| 3.3 | | $C_{22}H_{14}N_8S_2$ | 454.53 | 190 |

TABLE 2-continued polytetrazole cross-linking agents

| no. | Formula (I) | Brute formula | MW g/mol | att. T ° C. |
|---|---|---|---|---|
| 3.4 | | $C_{18}H_{18}N_8$ | 346.39 | 210 |
| 3.5 | | $C_{14}H_{14}N_8S_2$ | 358.44 | 190 |
| 3.6 | | $C_{42}H_{30}N_{12}O_3S_3$ | 846.96 | 190 |
| 3.7 | | $C_{26}H_{18}N_8$ | 442.47 | 185 |
| 3.8 | | $C_{26}H_{22}N_8O_2S_2$ | 542.64 | 190 |

TABLE 2-continued polytetrazole cross-linking agents

| no. | Formula (I) | Brute formula | MW g/mol | att. T ° C. |
|---|---|---|---|---|
| 3.9 | | $C_{49}H_{36}N_{16}O_4S_4$ | 1041.17 | 190 |
| 3.10 | | $C_{20}H_{22}N_8$ | 374.4 | 230 |

Synthesis of Compound 3.1

Following the synthetic path completely analogous to that described in Chem. Commun. (2016), 52, 9426, the ditetrazole compound 3.1 was prepared according to the following Scheme 6:

Scheme 6

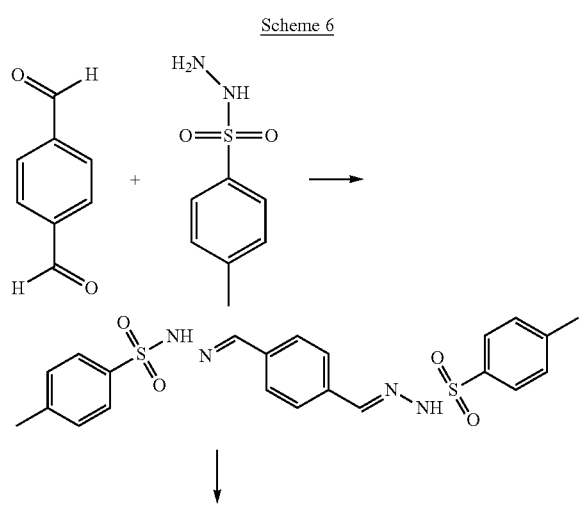

-continued

As reported in the literature, the synthesis consisted of two steps:

In the first, the aromatic aldehyde (1 eq.) was dissolved in ethanol. Tosylhydrazide (2 eq.) was added and stirred for 4 h at reflux. Subsequently water was added and the precipitate formed was recovered by filtering. The product thus obtained was used for the second step without further purification.

Subsequently the solid obtained in step 1 was dissolved in pyridine to give solution A. In parallel, a solution of NaNO2 (2 eq.) in water was added to a cooled solution of aniline (2 eq.), (conc.) HCl and water/ethanol (1:1), to give solution B. Solution A was cooled with an ice bath and solution B was added dripping slowly, stirring overnight at room temperature. Subsequently the solution was neutralised with diluted HCl and the formed precipitate was recovered. The reaction crude was purified by means of a chromatographic column or crystallized from a suitable solvent according to the type of tetrazole to remove impurities.

Similarly, compounds 3.2, 3.3 and 3.7 were prepared starting from the corresponding dialdehyde through the formation of dihydrazone and subsequent cyclization with aniline diazonium salt.

Synthesis of Compound 3.3

Compound 3.3 was also prepared by palladium-catalysed cross-coupling reactions of the boronate intermediate as reported in the following Scheme 7:

Scheme 7

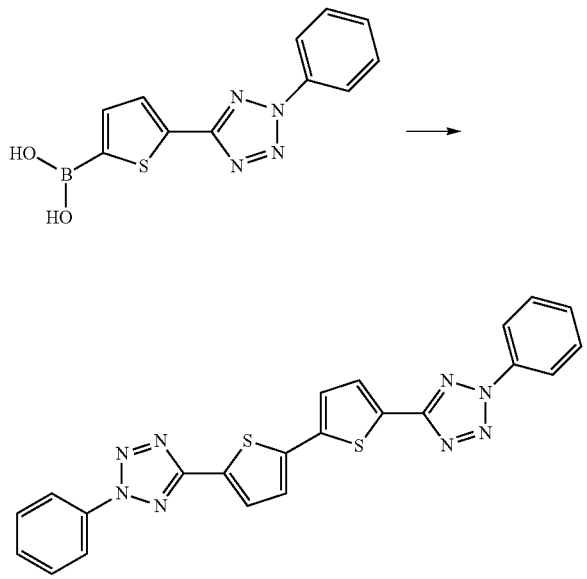

The tetrazole was dissolved in a DMF/H₂O mixture and Pd(OAC)₂ was added under magnetic stirring. Sodium acetate was then added and it was allowed to react overnight.

The processing of the reaction mixture was carried out as follows: the celite was filtered to remove the catalyst, the organic phase was extracted, the solvent was dried and the solvent evaporated. The crude was purified with a chromatographic column to give the expected product, pure based on NMR analysis.

Alternatively, compound 3.3 was prepared as shown in the following Scheme 8:

Scheme 8

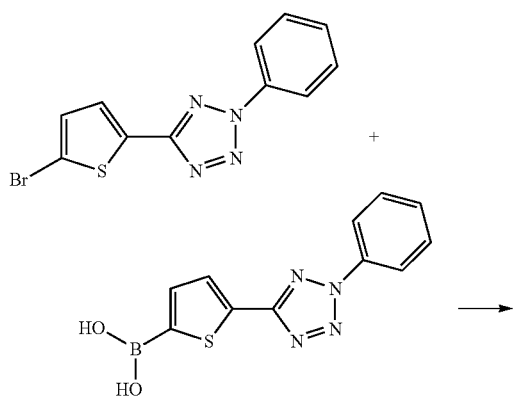

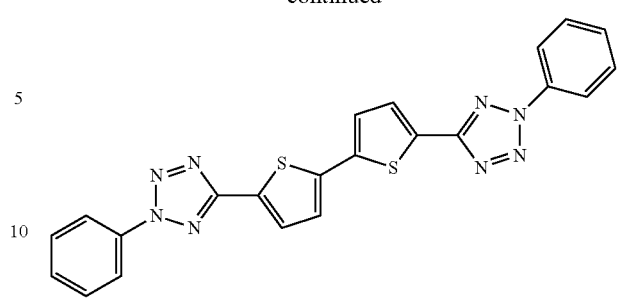

The two tetrazoles were dissolved in a DMF/H₂O mixture and Pd(OAC)₂ was added under magnetic stirring.

Subsequently sodium acetate was added and it was allowed to react overnight, heating to 60° C. It was then filtered on celite to remove the catalyst, the organic phase was extracted, anhydrified and the solvent evaporated. The crude was purified with a chromatographic column to give the clean product.

Synthesis of Compound 3.4

Compound 3.4 was prepared according to the following synthetic scheme:

Scheme 9

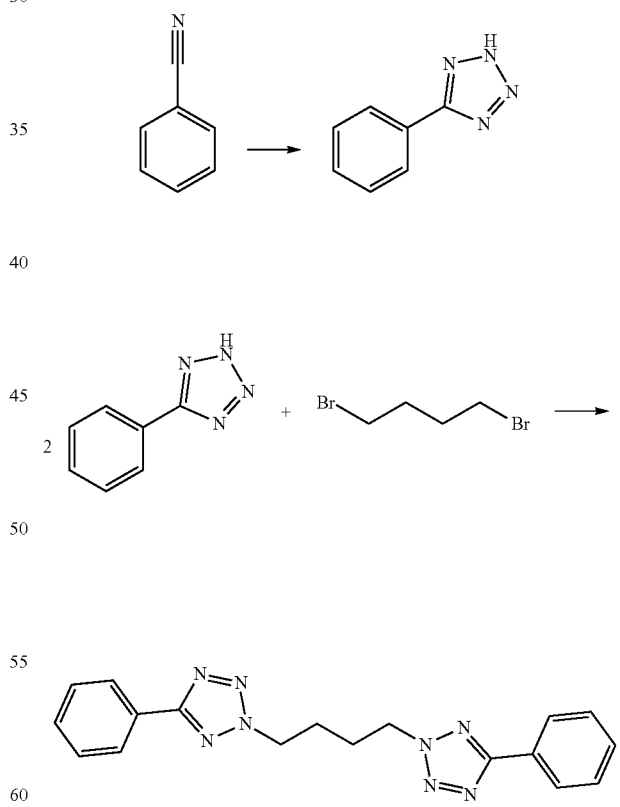

which included the formation of the NH-tetrazole intermediate from the corresponding nitrile and the subsequent alkylation reaction with dialoalkylene. Similarly, compounds 3.5, 3.6, 3.8, 3.9 and 3.10 were also prepared starting from the corresponding nitrile.

Scheme 10: synthesis of compound 3.6
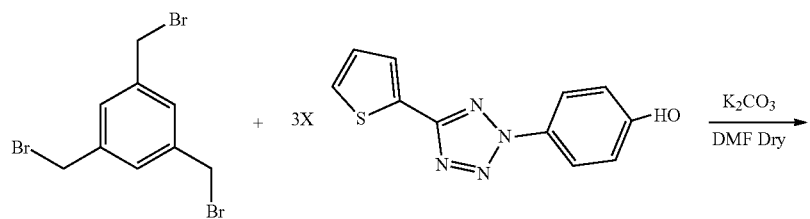
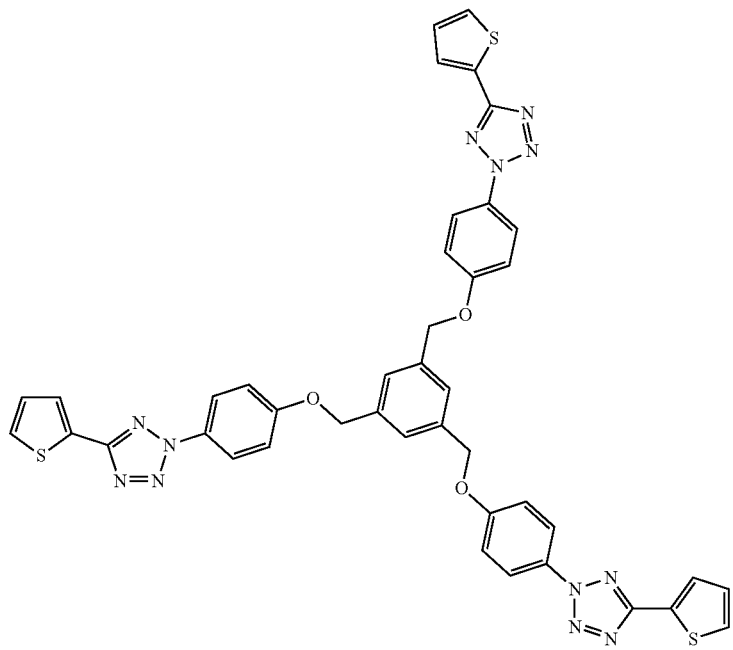
Scheme 11: synthesis of compound 3.9
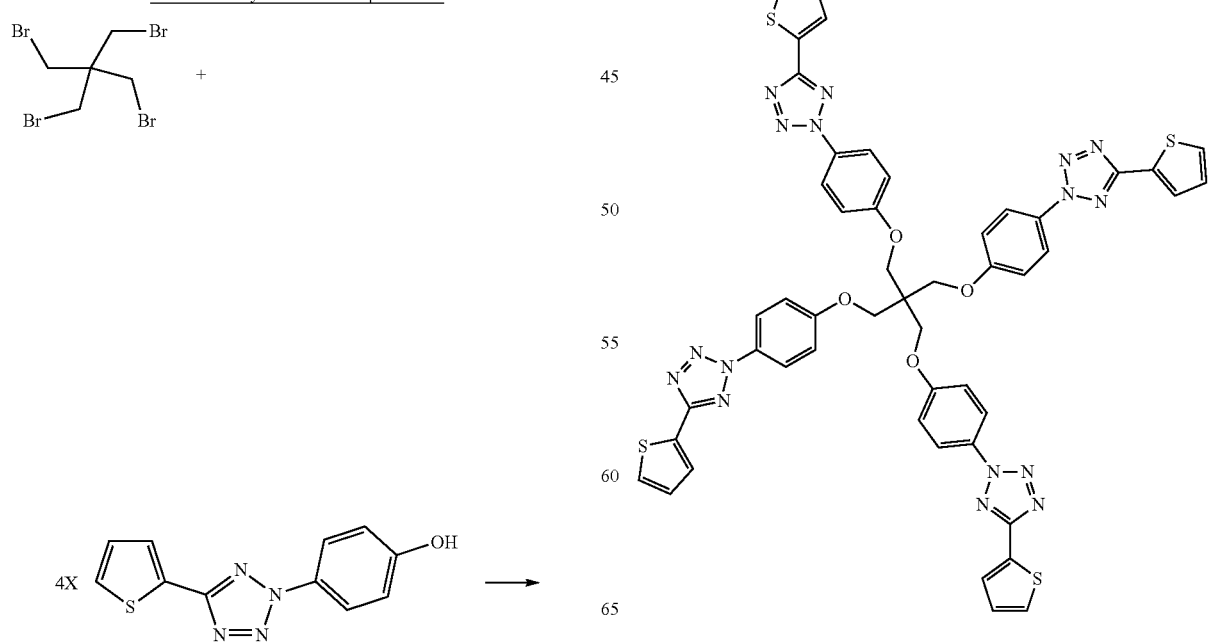

Characterisation of Polytetrazole Cross-Linking Agents 3.1-3.10

Figure 7:
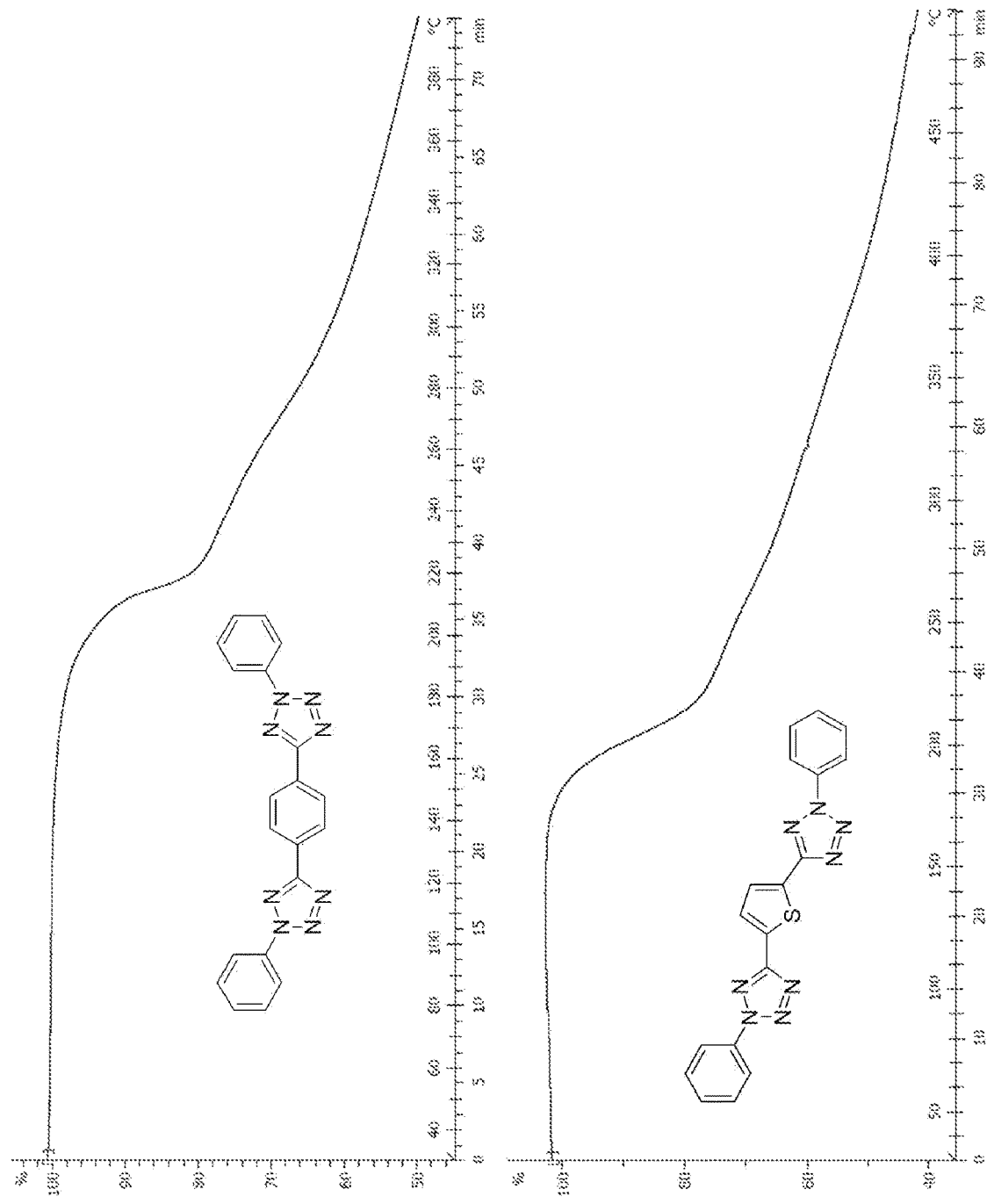
FIG. 7 (7A-7G) shows the plots of the thermogravimetric analysis (TGA) of polytetrazole cross-linking agents used in the invention.
Figure 7:
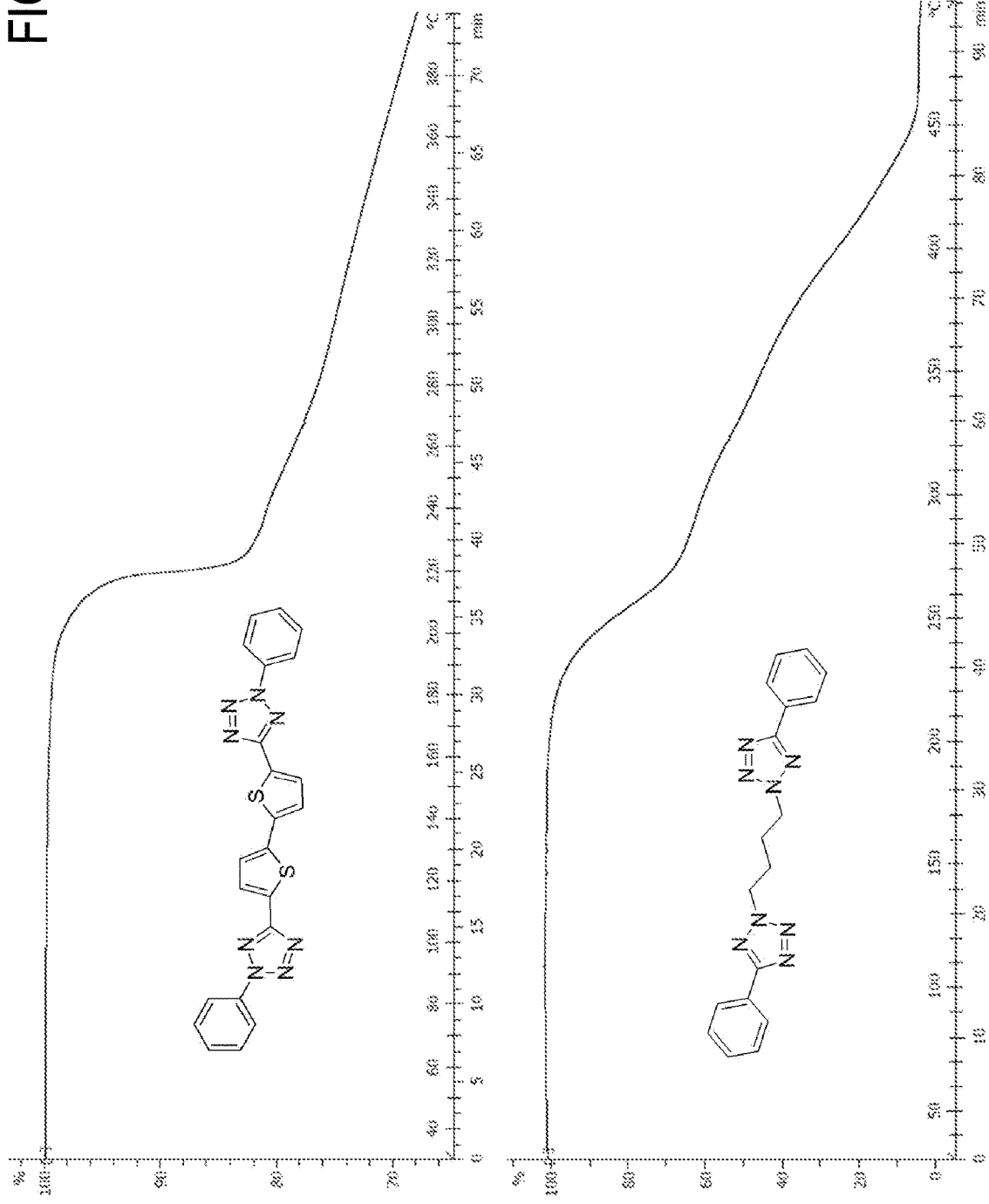
Figure 7:
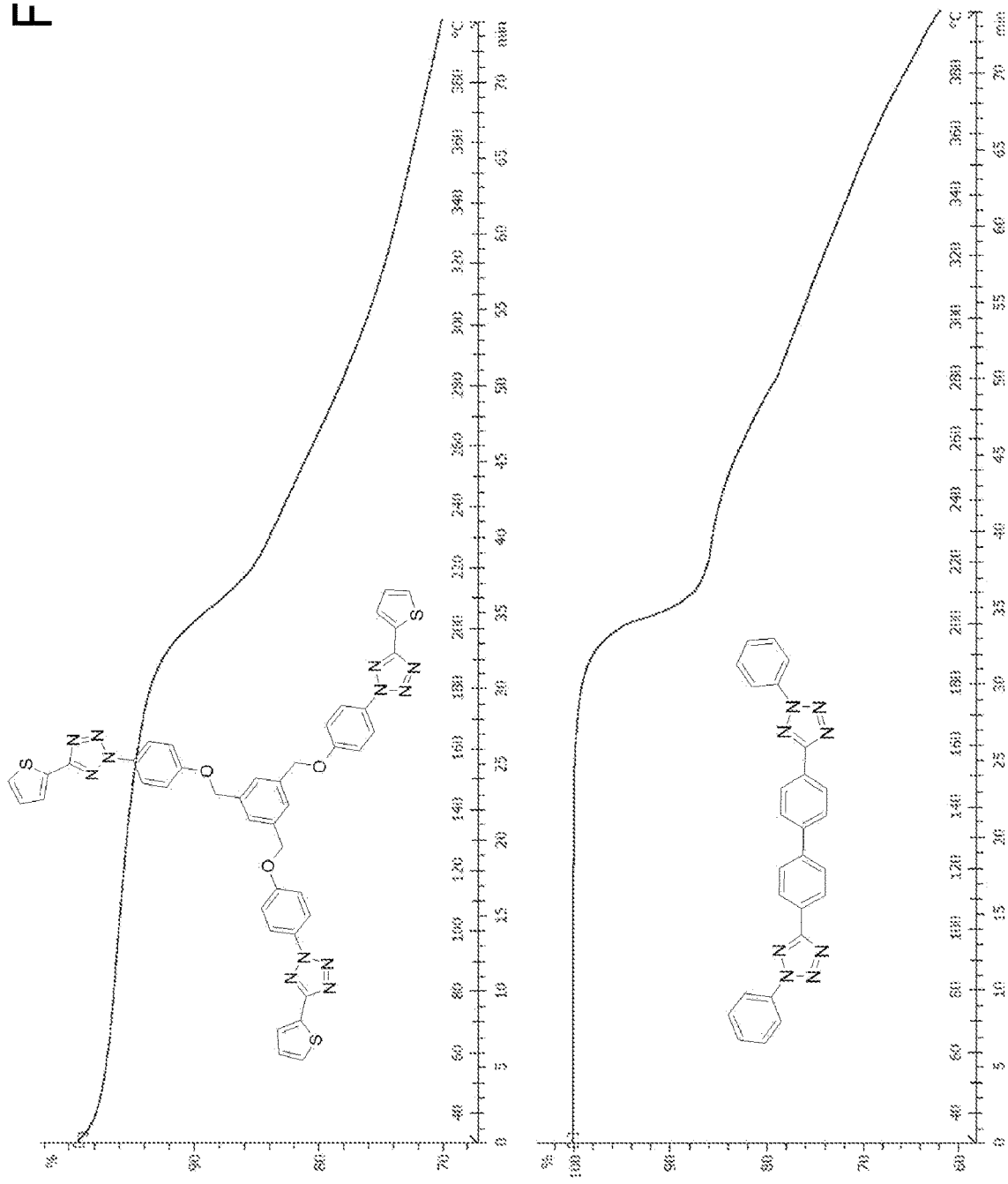
Figure 7:
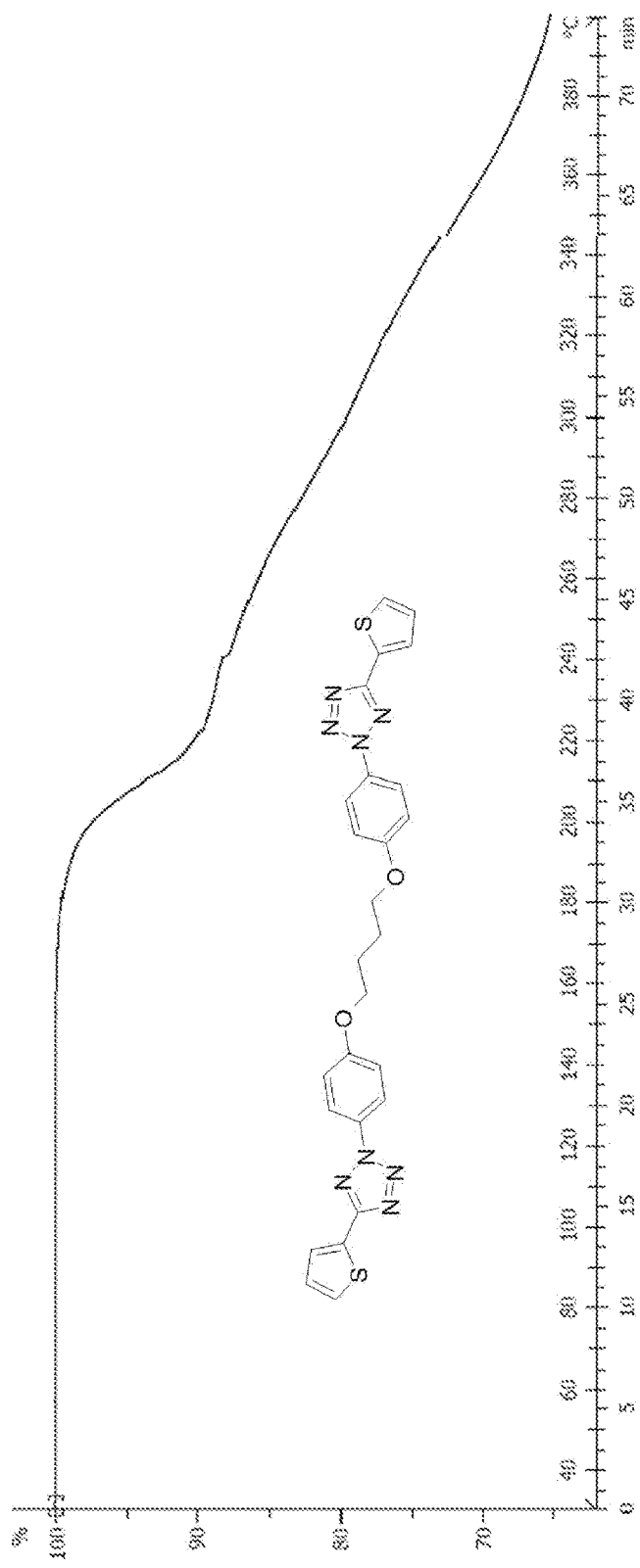

The polytetrazole compounds 3.1-3.10 were subjected to thermogravimetric analysis according to the previously reported method. In this test it was observed that at a temperature between 170° C. and 230° C. there was decomposition with weight loss due to the release of nitrogen. FIG. 7 (7A-7G) shows the tracings of these thermogravimetric analyses.

The activation temperatures thus measured are shown in the previous Table 2. Furthermore, the polytetrazole cross-linking agents 3.1-3.8 and 3.10 were characterised by 1H-NMR (400 MHZ, CDCl3), with the following results:

Polytetrazole cross-linking agent 3.1:0 8.44 (s, 1H), 8.31-8.18 (m, 1H), 7.64-7.57 (m, 1H), 7.53 (t, J=6.8 Hz, 1H);

Polytetrazole cross-linking agent 3.2:0 8.24-8.17 (m, 1H), 7.98 (s, 1H), 7.65-7.56 (m, 1H), 7.53 (ddd, J=7.4, 3.8, 1.2 Hz, 1H);

Polytetrazole cross-linking agent 3.3:0 8.23-8.17 (m, 1H), 7.86 (d, J=3.8 Hz, 1H), 7.64-7.56 (m, 1H), 7.52 (ddd, J=7.4, 3.7, 1.1 Hz, 1H), 7.36 (d, J=3.8 Hz, 1H);

Polytetrazole cross-linking agent 3.4:0 8.14-8.01 (m, 1H), 7.46-7.35 (m, 2H), 4.70-4.65 (m, 1H), 2.11-2.06 (m, 1H);

Polytetrazole cross-linking agent 3.5:0 7.80 (dd, J=3.6, 1.0 Hz, 1H), 7.45 (dd, J=5.0, 0.9 Hz, 1H), 7.15 (dd, J=4.9, 3.7 Hz, 1H), 4.68 (t, J=6.9 Hz, 1H), 2.23 (dt, J=14.7, 7.0 Hz, 1H);

Polytetrazole cross-linking agent 3.6:0 8.13-8.06 (m, 1H), 7.88 (dd, J=3.6, 1.1 Hz, 1H), 7.55 (s, 1H), 7.49 (dd, J=5.0, 1.1 Hz, 1H), 7.16 (ddd, J=15.8, 6.0, 2.9 Hz, 2H), 5.22 (s, 1H).

Polytetrazole cross-linking agent 3.7:0 8.43-8.38 (m, 1H), 8.26 (dd, J=8.5, 1.2 Hz, 1H), 7.87 (d, J=8.5 Hz, 1H), 7.63 (dd, J=8.4, 6.9 Hz, 1H), 7.59-7.52 (m, 1H);

Polytetrazole cross-linking agent 3.8:0 8.10-8.04 (m, 1H), 7.89 (dd, J=3.7, 1.2 Hz, 1H), 7.49 (dd, J=5.0, 1.2 Hz, 1H), 7.18 (dd, J=5.0, 3.7 Hz, 1H), 7.07-7.01 (m, 1H), 4.08 (t, J=6.0 Hz, 1H), 3.51 (t, J=6.5 Hz, 1H).

Polytetrazole cross-linking agent 3.10:0 8.64-7.92 (m, 1H), 7.53-7.45 (m, 2H), 4.65 (t, J=7.0 Hz, 1H), 2.14-2.02 (m, 1H), 1.49-1.41 (m, 1H).

The thermograms (TGA) of compounds 3.1-3.4 and 3.6-3.8 are shown in FIGS. 7A to 7G.

Example 4

Study of the Cross-Linking Ability of Tetrazole Cross-Linking Agents

The tetrazole cross-linking agents of the invention (2,5-disubstituted polytetrazole compounds 3.1-3.10) were dispersed in the Polyvest 130 (weighing an amount of cross-linking agent equal to about 0.5% of the weight of the oligomer), the dispersions inserted in a test tube and heated to the activation temperatures identified by TGA, keeping them at that temperature for 30 minutes.

In each case, a gelatinous mass insoluble in toluene was obtained, which showed marked fluorescence under UV light.

For example, in the case of compound 3.4, by heating the mixture of compound 3.4 with Polyvest 130S (1:200), at a temperature of about 200° C. for 30 minutes, the transformation of the liquid mass into a UV fluorescent insoluble gel was observed, demonstrating that cross-linking had taken place.

Example 5

Preparation of Elastomeric Compounds Including Silica

Comparative elastomeric compounds were prepared, free of polytetrazole cross-linking agents according to the invention (Examples 5.1), or according to the invention (Ex. 5.2-5.3). The quantities of the various components expressed in phr and their addition step to the compound are shown in the following Table 3:

TABLE 3

| Step | Ingredients (phr) | Example 5.1 | Example 5.2 | Example 5.3 |
|---|---|---|---|---|
| 1-0 | SSBR | 137 | 137 | 137 |
| 1-1 | Silica | 60 | 60 | 60 |
| 1-1 | Polytetrazole (C) 3.1 Activation T 185° C. | — | 4.2 | — |
| 1-1 | Polytetrazole (C) 3.2 Activation T 170° C. | — | — | 4.3 |
| 1-1 | 6PPD | 2.5 | 2.5 | 2.5 |
| 1-1 | Silane TESPD | 4.8 | 4.8 | 4.8 |
| 1-2 | Stearic acid | 1 | 1 | 1 |
| 1-2 | ZnO (80%) | 2 | 2 | 2 |
| 2-0 | CBS | 3 | 3 | 3 |
| 2-0 | Sulphur (67%) | 1 | 1 | 1 | wherein:
SBR: styrene-butadiene copolymer from solution extended with 37.5 phr of TDAE oil for every 100 phr of Dow SE SLR-4630 dry elastomeric polymer; Silica: ZEOSIL 1165 MP. Supplier SOLVAY RHODIA OPERATIONS Stearic acid: Supplier TEMIX OLEO SRL 6PPD: N-(1,3-dimethylbutyl)-N'-phenyl-p-phenylenediamine, Supplier: EASTMAN ZnO (80): 80% zinc oxide, 20% polymeric binder and dispersing agent, Supplier LANXESS ADD Silane: TESPD Bis-(3-triethoxy-silyl-propyl)disulphide, Supplier JINGZHOU JIANGHAN FINE CHEM CBS: N-cyclohexyl-2-benzothiazilsulphenamide, cyclohexylamine content <1%, DUSLO Supplier Sulphur: Crystex OT33 amorphous sulphur, insoluble in CS2 and in toluene. Treated with 33% hydrotreated heavy naphthenic distillate (petroleum), Supplier EASTMAN. The mixing was carried out in several steps using an internal Brabender laboratory tangential rotor mixer (60 ml mixing chamber).

In the first step (1-0), 50% of the elastomer was introduced and chewed for 30 seconds at 140° C. (set temperature).

In the following step (1.1), polytetrazole (C), silica, silane and the remaining elastomer were added. The mixing was continued for 2 minutes, at 140° C. Subsequently the antioxidant, ZnO and the stearic acid were introduced. The mixing was continued for about 2 minutes, until the reaction between stearic acid and zinc was completed, again at 140° C. after which the compounds-called first step compounds-were discharged, and tested for their dynamic properties.

After 12-24 hours, in step (2), carried out using the same mixer, the vulcanising agent (sulphur) and the accelerant were introduced, and the mixing continued for about 3 minutes at 90° C., when the final compounds were discharged and tested again for their dynamic properties.

Dynamic Mechanical Properties

The first and final step compounds, comparative and according to the invention, green and heated at 190° C. for 30', were subjected to analysis of the dynamic mechanical rheological properties, according to the previously described method.

Figure 8:
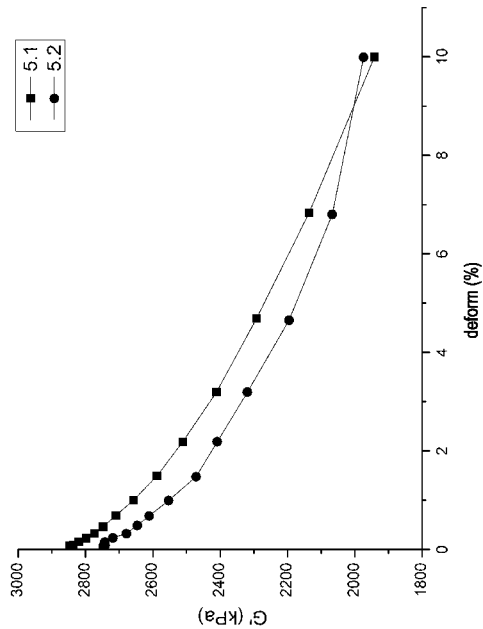
FIG. 8 (8A-8H) shows the dynamic characterisation at 70° C. (G' and tan Delta) vs deformation (% strain) of material samples obtained from the comparative composition (Ex. 5.1) and according to the invention (Ex. 5.2) at various mixing and cross-linking levels and the S' vs time curve in the cross-linking itself conducted at 190° C.
Figure 8:
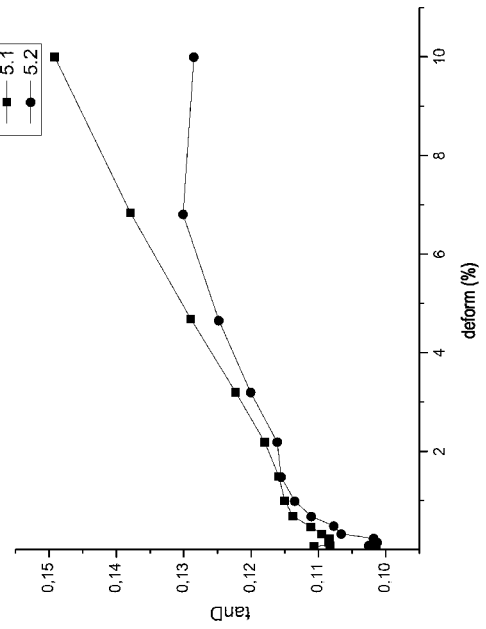
Figure 8:
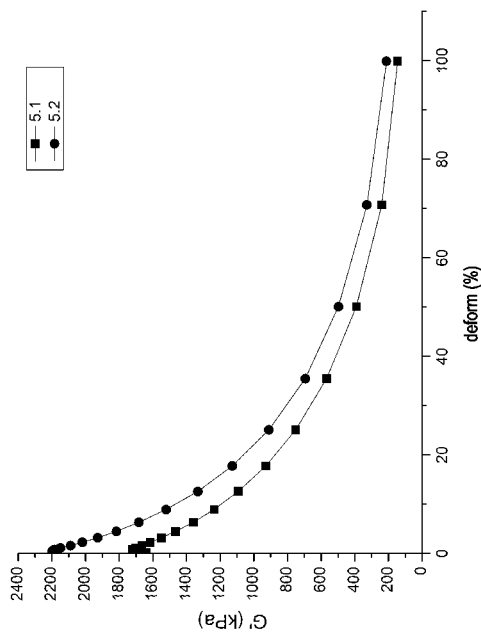
Figure 8:
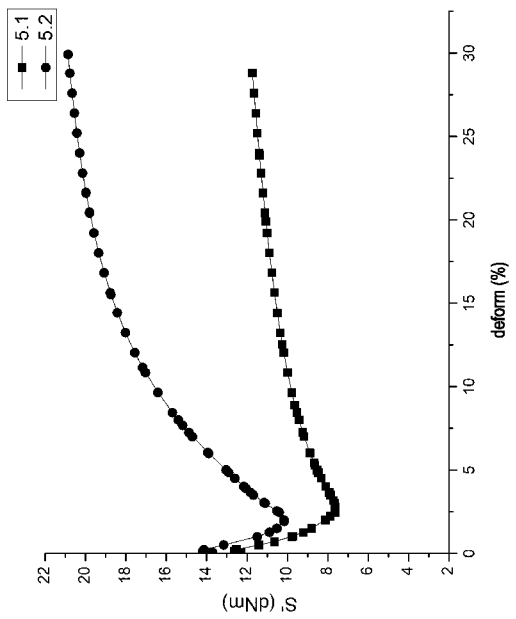
Figure 8:
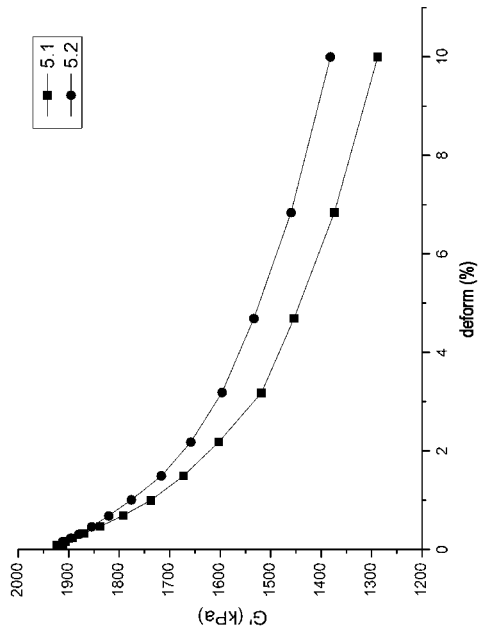
Figure 8:
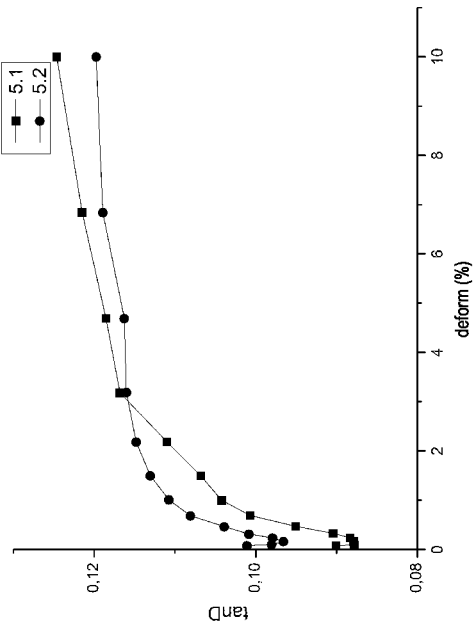
Figure 8:
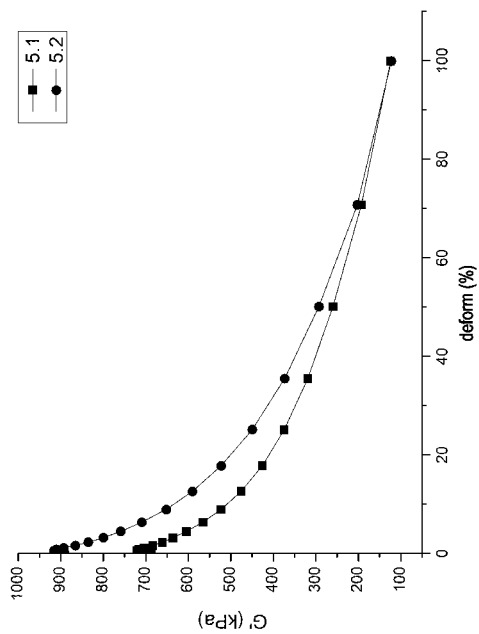
Figure 8:
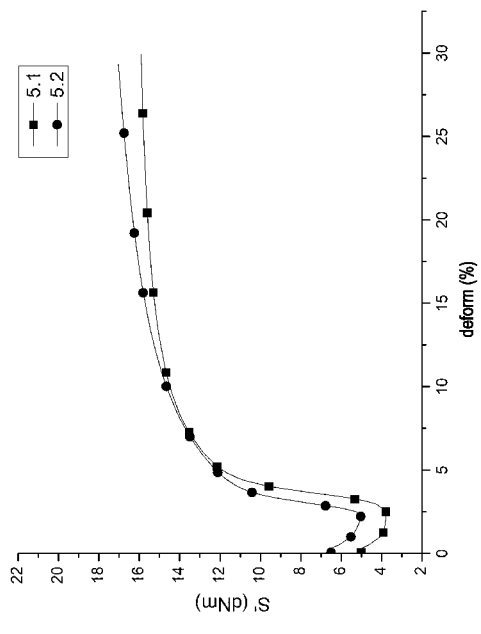

In particular, FIG. 8 shows the diagrams relating to:

8A: elastic modulus G' at 10 Hz, 70° C. measured on samples of green first-step compounds of the comparative examples 5.1 and 5.2 of the invention 8B: torque cross-linking curve S' at 190° C. measured on samples of green first-step compounds of the comparative examples 5.1 and 5.2 of the invention 8C: elastic modulus G' at 10 Hz, 70° C. measured on samples of first-step compounds heated to 190° C. for 30' of the comparative examples 5.1 and 5.2 of the invention 8D: tan delta at 10 Hz, 70° C. measured on samples of first-step compounds heated to 190° C. for 30' of the comparative examples 5.1 and 5.2 of the invention;

8E: elastic modulus G' at 10 Hz, 70° C. measured on samples of final green-compounds of the comparative examples 5.1 and 5.2 of the invention 8F: torque cross-linking curve S' at 190° C. measured on samples of green final compounds of the comparative examples 5.1 and 5.2 of the invention 8G: elastic modulus G' at 10 Hz, 70° C. measured on samples of final compounds heated to 190° C. for 30' of the comparative examples 5.1 and 5.2 of the invention 8H: tan delta at 10 Hz, 70° C. measured on samples of final compounds heated to 190° C. for 30' of the comparative examples 5.1 and 5.2 of the invention.

From graphs 8A-8H of FIG. 8, it is observed that in the first-step and final green compounds, the addition of the polytetrazole cross-linking agent of Example 3.1 led the inventive compound 5.2 to have an elastic modulus at low deformations higher than that of respective reference compound 5.1. The difference in elastic modulus in these green compounds tended to decrease as the deformation increased: as evident from FIGS. 8A and 8E in the green compounds the polytetrazole cross-linking agent tended to increase the Payne effect. This effect could be due to the fact that the tetrazole cross-linking compound was relatively poorly soluble in the compound at 70° C. and therefore behaved like a filler. The increased Payne effect of the green compound did not have negative consequences, on the contrary it could be useful in some semi-finished products, resulting in a greater strength of the green material, which reduces the risk of deformation of the semi-finished product itself during the building steps.

The cross-linking curves measured at 190° C. shown in FIG. 8B for the first-step compounds and 8F for the final compounds showed the effectiveness of the polytetrazole cross-linking agent: in the case of the first-step compounds there was a very marked increase in torque compared to the reference, and also in the case of complete compounds also including standard vulcanising agents, the final torque was higher for the inventive compound 5.2.

Surprisingly, FIGS. 8C and 8G showed that in the compounds (first-step and final, respectively) after a heating cycle at the activation temperature of the polytetrazole cross-linking agent, the agent led to a marked decrease of the Payne effect in the cross-linked compound. The decrease of the Payne effect in the vulcanised compound was unexpected, since the lattice between the polymer chains should have also increased the modulus at low and high deformations. We can hypothesise that the decrease in the Payne effect was linked to the homogeneity of the lattice formed in the presence of the polytetrazole cross-linking agent of the invention, and that it could reduce the possibilities of interaction of the filler with itself. The decrease in the Payne effect is considered of technological interest as it is often associated with a lower hysteresis and a sign of a greater linearity of the mechanical response of the tyre. A tyre with a more linear response is more predictable and more precise and therefore safer.

FIGS. 8D and 8H showed that in the first-step and final compounds respectively, after a heating cycle at the activation temperature of the polytetrazole cross-linking agent, the presence of the agent led to a significant reduction of the hysteresis at 70° C. of the cross-linked compound, at least at deformations higher than about 3%, which are those of technological interest since the tyre under load easily reaches local deformations of the order of 10% and higher. The hysteresis at 70° C. is considered a predictor of tyre rolling resistance, so such an effect was certainly interesting.

Analysis of the Rheological Properties

The final green compounds according to the invention and comparative of Ex. 5 were subjected to analysis of the dynamic mechanical rheological properties by subsequent heating at two different temperatures, according to these conditions:

1) deformation cycle up to 100% at 70° C., 10 Hz to determine the rheological properties of the green compounds,
2) heating at 150° C. for 40 minutes to obtain a first low T cross-linking in which only the sulphur vulcanisation system was activated,
3) deformation cycle up to 10% at 70° C., 10 Hz to determine the dynamic properties after the first cross-linking,
4) heating at 190° C. for 30 minutes to complete the cross-linking by also bringing into play the polytetrazole cross-linking agent,
5) deformation cycle up to 10% at 70° C., 10 Hz to determine the dynamic properties after the second cross-linking.

The first heating at 150° C. induced the cross-linking with sulphur, the second at 190° C. the further cross-linking due to the polytetrazole cross-linking agent 3.1.

Figure 9:
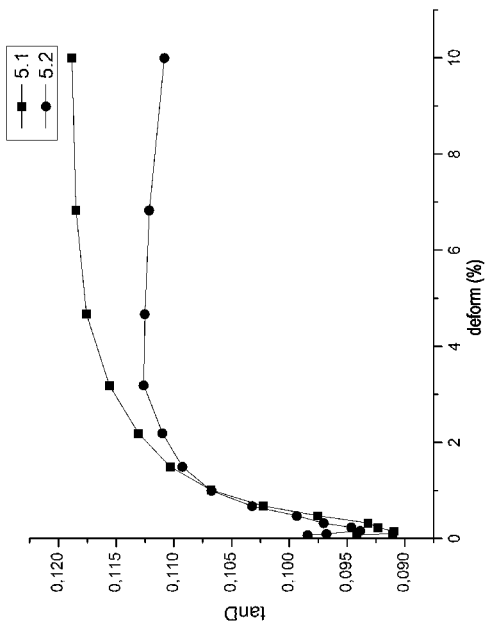
FIG. 9 (9A-9D) shows the dynamic characterisation at 70° C. (G' and tan Delta) vs deformation (% strain) of material samples obtained from the comparative composition (Ex. 5.1) and according to the invention (Ex. 5.2) after heating to 150° C. and 190° C.
Figure 9:
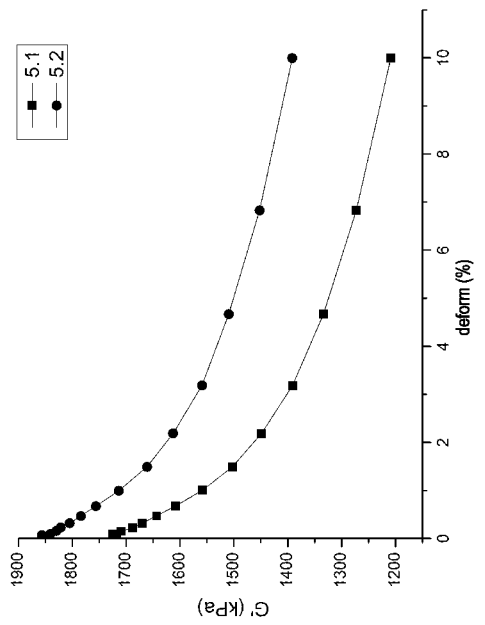
Figure 9:
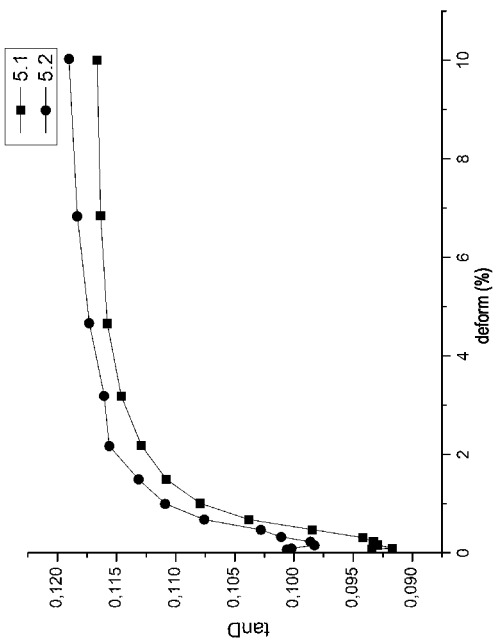
Figure 9:
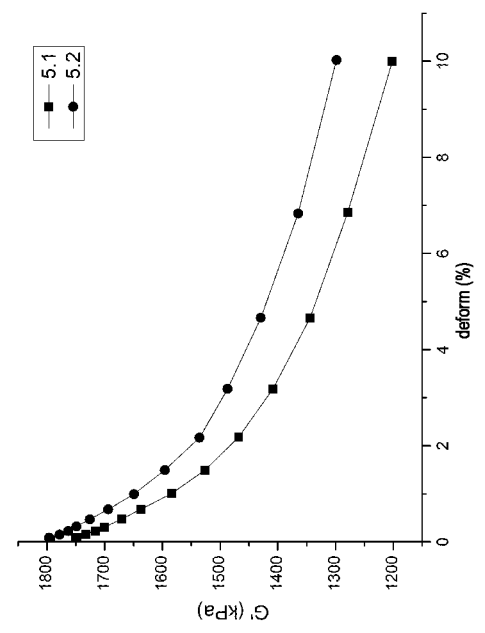

FIG. 9 shows the diagrams relating to:

9A: elastic modulus G' at 10 Hz, 70° C. measured on samples of final compounds after a thermal cycle of 40 min. at 150° C. of the comparative examples 5.1 and 5.2 of the invention (step 3 of the procedure described above)

9B: tan delta at 10 Hz, 70° C. measured on samples of final compounds after a thermal cycle of 40 min. at 150° C. of the comparative examples 5.1 and 5.2 of the invention (step 3 of the procedure described above)

9C: elastic modulus G' at 10 Hz, 70° C. measured on samples of final compounds after a thermal cycle of 30 min. at 190° C. of the comparative examples 5.1 and 5.2 of the invention (step 5 of the procedure described above)

9D: tan delta at 10 Hz, 70° C. measured on samples of final compounds after a thermal cycle of 30 min. at 190° C. of the comparative examples 5.1 and 5.2 of the invention (step 5 of the procedure described above).

From the curves of FIGS. 9A-9D the following could be observed.

After the first cross-linking at 150° C. (step 2 of the above procedure), the measurement of the dynamic properties at 70° C. (step 3) showed that:

the hysteresis of the compounds of the comparative examples 5.1 and 5.2 of the invention were very similar, as reported in FIG. 9A, but the compound 5.2 still tended to be a little more hysteretic, as expected for the addition of a small molecule, which if unreacted should behave like a plasticiser;

the dynamic modulus G' of the compound according to the invention 5.2 and of reference 5.1 were relatively similar (FIG. 9B), but a decrease in the Payne effect was already noted for the inventive compound 5.2. This could be interpreted as indicative of a partial reaction of the polytetrazole cross-linking agent, albeit at temperatures lower than the activation temperature, which can be explained by the interaction with the complex matrix of the compound.

After the second cross-linking at 190° C. (step 4 of the above procedure), the measurement of the dynamic properties at 70° C. (step 5) showed that:

the hysteresis of the compound of the example 5.2 of the invention was decidedly lower than that of the comparative compound 5.1, as reported in FIG. 9C;

the dynamic modulus G' of the compound according to the invention 5.2 was decidedly higher than that of the reference compound 5.1 while there was a strong decrease in the Payne effect for the inventive compound 5.2.

Table 4 below summarises the dynamic properties measured for the compounds of Examples 5.1-5.3.

TABLE 4

| Compounds | | Example 5.1 | Example 5.2 | Example 5.3 |
|---|---|---|---|---|
| Final green 70° C., 10 Hz | G' 9% | 522.74 | 651.7 | 524.07 |
| | ΔG (0.5-10%) | 197.61 | 262.88 | 200.06 |
| Final heating 150° C. 40 min. 70° C., 10 Hz | G' 9% | 1201.65 | 1298.28 | 1218.21 |
| | ΔG (0.5-10%) | 469.38 | 427.74 | 488.54 |
| | Tan D 9% | 0.117 | 0.119 | 0.133 |
| Final heating 190° C. 30 min. 70° C., 10 Hz | G' 9% | 1208.6 | 1391.65 | 1215.87 |
| | ΔG (0.5-10%) | 614.8 | 392.38 | 422.80 |
| | Tan D 9% | 0.133 | 0.111 | 0.122 |

From the values in the tables it was noted that the trend of the dynamic properties using the polytetrazole cross-linking agent of Example 3.2 in the compound of Example 5.3 was completely similar to that observed for the agent of Example 3.1 in compound 5.2. In fact, the presence of the polytetrazole cross-linking agent heated to a temperature at least equal to the activation temperature led to a reduction in both the hysteresis and the Payne effect in the cross-linked compound. In the respective green or only vulcanised compounds at temperatures lower than those of activation of the tetrazole agent of the invention, the effects were much lower and in some cases in the opposite direction, compared to that expected for the addition of a species with possible plasticising activity to the compound.

Static Mechanical Properties

The compound of Example 5.3, compared with the reference compound of Example 5.1, was also subjected to the evaluation of the static mechanical properties, with the results reported in the following Table 5:

TABLE 5

| | | Example 5.1 | Example 5.3 |
|---|---|---|---|
| Vulcanisation 30 min. 190° C. | Ca0.1 Mpa | 0.55 | 0.57 |
| | Ca0.5 Mpa | 1.54 | 1.60 |
| | Ca1 Mpa | 2.81 | 3.20 |
| | Ca3 Mpa | 11.75 | 14.44 |
| | CR Mpa | 15.64 | 15.94 |

From the values in the tables it was noted that the polytetrazole cross-linking agent of Example 3.2 in the compound of Example 5.3 had a marked effect of increasing the loads at high elongation (load at 300%, CA3), without decreasing the breaking strength of the compound, as would be instead expected for an increase in the standard vulcanising agent: this data could also be interpreted by assuming that the tetrazole agent would lead to a higher homogeneity of the lattice compared to standard vulcanising agents.

In conclusion, from the tests carried out and from the results of the above tests it appears that the polytetrazole cross-linking agent 3.1 had a positive effect on the dynamic properties of the compound and, in particular, led to a decrease in the hysteresis and the Payne effect of the vulcanised product.

Furthermore, it was observed that these effects occurred when the polytetrazole cross-linking agent was used both in the absence and in the presence of sulphur vulcanising agents, and essentially at the activation temperature of the cross-linking agent itself, as determined by the thermogravimetric tests.

Example 6

Preparation of Elastomeric Compounds Comprising Carbon Black

Comparative elastomeric compounds were prepared, free of polytetrazole cross-linking agents according to the invention (Example 6.1), or according to the invention (Ex. 6.2, 6.3 and 6.4). The quantities of the various components expressed in phr and their addition step to the compound are shown in the following Table 6:

TABLE 6

| Step | Ingredients (phr) | Example 6.1 | Example 6.2 | Example 6.3 | Example 6.4 |
|---|---|---|---|---|---|
| 1-0 | SBR | 137 | 137 | 137 | 137 |
| 1-1 | CB 234 | 60 | 60 | 60 | 60 |
| 1-1 | Polytetrazole (C) 3.2 Activation T 170° C. | — | 4.3 | 5.7 | 7.2 | wherein

SSBR: styrene-butadiene copolymer from solution extended with 37.5 phr of TDAE oil for every 100 phr of Dow SE SLR-4630 dry elastomeric polymer;

CB 234: Birla Carbon grade N234 carbon black.

The mixing was carried out using an internal Brabender laboratory tangential rotor mixer (60 ml mixing chamber).

In the first step (1-0), 50% of the elastomer was introduced and chewed for 30 seconds at 140° C. (set temperature).

In the following step (1.1) polytetrazole (C), in carbon black and the remaining elastomer were added.

The mixing was continued for 2 minutes, at 140° C.

Swelling Tests

Swelling tests (average of three samples) on cross-linked compounds at 190° C. for 30 minutes were carried out on samples 6.1, 6.2, 6.3 and 6.4 considering the first sample comparable to the green compound, since the sample did not dissolve even in absence of cross-linking agent thanks to the gel state due to the filler (see for example B. Meissner, Rubber Chemistry and Technology, 1995, vol. 68, p. 298).

TABLE 7

|  |  | Example 6.1 | Example 6.2 | Example 6.3 | Example 6.4 |
|---|---|---|---|---|---|
| Vulcanisation 30 min. 190° C. | Initial weight | 406 | 335 | 349 | 373 |
|  | Dry weight | 221 | 252 | 245 | 267 |
|  | Swollen weight | 1829 | 1705 | 1515 | 1405 |
|  | Swelling % | 731% | 645% | 507% | 425% |

Dynamic Mechanical Properties

The compounds 6.1 and 6.2, comparative and according to the invention respectively, were subjected to analysis of the dynamic mechanical rheological properties, according to the previously described method.

Figure 10:
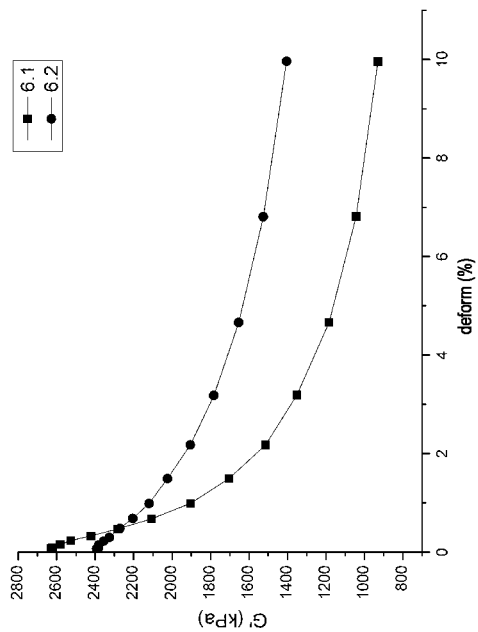
FIG. 10 (10A-10D) shows the dynamic characterisation at 70° C. (G' and tan Delta) vs deformation (% strain) of material samples obtained from the comparative composition (Ex. 6.1) and according to the invention (Ex. 6.2), green and after cross-linking, as well as the S' vs time curve in the same cross-linking conducted at 190° C.

FIG. 10 shows the diagrams relating to:

10A: elastic modulus G' at 10 Hz, 70° C. measured on samples of green compounds of the comparative examples 6.1 and 6.2 of the invention;

10B: torque cross-linking curve S' at 190° C. measured on samples of green compounds of the comparative examples 6.1 and 6.2 of the invention;

10C: elastic modulus G' at 10 Hz, 70° C. measured on samples of compounds heated to 190° C. for 30' of the comparative examples 6.1 and 6.2 of the invention;

10D: tan delta at 10 Hz, 70° C. measured on samples of compounds heated to 190° C. for 30' of the comparative examples 6.1 and 6.2 of the invention.

From the trend of the diagrams it was observed that in the green compound, the addition of the polytetrazole cross-linking agent of Example 3.2 led the inventive compound 6.2 to have an elastic modulus at low deformations higher than that of the respective reference compound 6.1 (FIG. 10A), similarly to what observed for example 5.

Furthermore, the cross-linking curves measured at 190° C. shown in FIG. 10B showed the effectiveness of the polytetrazole cross-linking agent: the final torque was significantly higher for the inventive compound 6.2, as observed for example 5 while the torque increase for the reference compound was interpretable as the effect of the flocculation of the filler.

After a heating cycle to the activation temperature of the polytetrazole cross-linking agent, the presence of the agent led to a marked decrease of the Payne effect in the cross-linked compound, as shown in FIG. 10C.

The decrease of the Payne effect in the vulcanised compound was unexpected, since the lattice between the polymer chains should have also increased the modulus at low and high deformations. We can hypothesise that the decrease in the Payne effect was linked to the homogeneity of the lattice formed in the presence of the polytetrazole cross-linking agent, which could reduce the possibilities of interaction of the filler with itself. The decrease in the Payne effect is considered of technological interest as it is often associated with a lower hysteresis and a sign of a greater linearity of the mechanical response of the tyre. A tyre with a more linear response is more predictable and more precise and therefore safer. Therefore, the same considerations as for Example 5 apply.

Finally, the presence of the cross-linking agent, after thermal activation, led to a significant reduction of the hysteresis at 70° C. of the cross-linked compound, as shown in FIG. 10D. The hysteresis at 70° C. is considered a predictor of tyre rolling resistance, so such an effect is certainly interesting.

From this evidence, it can be concluded that the present polytetrazole cross-linking agents, both used as cross-linking agents only and together with classic sulphur-based cross-linking agents, are able to significantly reduce the hysteresis of elastomeric compounds with undoubted advantages in terms of lower resistance to rolling of the tyre and, last but not least, vehicle consumption.

Furthermore, the polytetrazole cross-linking agents of the invention, both used alone and together with classic sulphur-based cross-linking agents, are able to significantly reduce the Payne effect of the vulcanised compounds, with predictable advantages on the driving precision of the vehicle and therefore ultimately on safety. Advantageously, by appropriately selecting the substituents present on the tetrazoles, it is possible to modify their activation temperature bringing it to similar or decidedly different values from those necessary to trigger the classic sulphur cross-linking, being able to range in terms of application possibilities.

For example, by selecting a tetrazole cross-linking agent with a high activation temperature as the sole or main cross-linking agent of an elastomeric compound, it is possible to prepare, for example, semi-finished products (e.g. extruded, calendared) minimising the risk of scorching or undesired pre-cross-linking in the preliminary mixing steps of the components even when working at temperatures higher than conventional ones, as long as they remain below the activation temperature of the cross-linking agent.

This allows simplifying the preparation process of the compound and of the semi-finished products, no longer having to strictly control the temperatures during the mixing step and the subsequent operations that lead to the green tyre.

In fact, the cross-linking carried out with the present cross-linking agents appears much more controllable than the classic sulphur cross-linking, allowing the mixing to be prolonged until optimal dispersion and homogeneity is obtained and only at the end raising the temperature above the activation temperature of the tetrazole to proceed with the cross-linking.

In the case of mixtures of tetrazole cross-linking agents and sulphur-based cross-linking agents in the same compound, they may be cross-linked simultaneously or in subsequent moments, even distant, and in a different sequence by selecting the tetrazole cross-linking agent with the suitable activation temperature—equal to, higher than or lower than the sulphur cross-linking agent—and the appropriate thermal process conditions, depending on the particular applications of the tyre.

For example in sports competitions, the tyre overheats and degrades, deteriorating in performance as the race progresses. In these cases, if in the components of the tyre there are tetrazole cross-linking agents that have not reacted-because they have a higher activation temperature and, therefore, are resistant to the vulcanisation conditions-when the activation temperature is reached during use in the tyre, cross-linking reactions will be triggered with the formation of new bonds and consolidation of the material, thus being able to counteract the degradation thereof.

The polytetrazole cross-linking agent therefore becomes an auxiliary system that comes into play to repair the damage in the material when it degrades, subsequently activating only when in intensive use the tyre reaches certain critical temperatures.

In other applications it may be advantageous to use tetrazole cross-linking agents with activation temperature lower than that of the classic sulphur cross-linking agents for pre-cross-linking semi-finished products that are difficult to handle or which in the final stages of the process leading to the tyre, benefit from a very high viscosity of the compound, which cannot be managed in obtaining the semi-finished products themselves and therefore must be induced after the formation of the semi-finished product with a pre-cross-linking process of the compound.

For example, certain semi-finished products, such as carcass plies for car applications, risk being deformed in the tyre building steps and above all risk being penetrated by the liner compound in the moulding step at the area where the side edges of the tread band are connected to the sidewall: it is known to overcome this problem with a pre-cross-linking induced by ionising radiation (electron beam), which however requires a lot of energy and a considerable investment: the use of tetrazole cross-linking agents with low activation T allows obtaining a similar pre-cross-linking simply by thermal means, without compromising either the adhesiveness of the plies or substantially the standard sulphur vulcanisation, which will take place during the vulcanisation step.

Another advantage of the present polytetrazole cross-linking agents, compared to the classic sulphur-based cross-linking agents, is the possibility, by choosing the appropriate substituents on the tetrazoles, to optimise the solubility thereof and therefore the dispersion thereof, which may be homogeneous or targeted to a specific phase, in the elastomeric compound of use.

Consequently, it is possible to obtain a homogeneous cross-linking throughout the mass or a greater cross-linking density in particular areas, for example in the vicinity of the reinforcing fillers, if the polytetrazole cross-linking agent carries groups with high affinity for them, such as silanes or polyalkoxyl groups particularly similar to silica, or in a not very polar elastomeric phase if said groups carry long aliphatic chains or lipophilic polyaromatic systems.

On the basis of the activation temperature of the polytetrazole cross-linking agents selected for optimal solubility, the incorporation and dispersion steps will then be carried out, maintaining the temperature at lower values, prolonging the mixing until the desired dispersion in the compound is achieved without risk of pre-cross-linking.

In conclusion, in addition to imparting lower hysteresis and retaining the modulus of the compounds even under stress, the present polytetrazole cross-linking agents prove to be much more modulable in terms of reaction temperatures and solubility than the more classic cross-linking agent, sulphur. Advantageously, these compounds allow selective cross-linking to take place in certain components, at certain temperatures and therefore in precise steps of the production process or use of the tyre.

The invention claimed is:

1. An elastomeric composition for tyre compounds comprising at least:
   100 phr of at least one diene elastomeric polymer (A),
   at least 0.1 phr of at least one reinforcing filler (B),
   at least 0.1 phr of at least one polytetrazole cross-linking agent (C) of formula (I)

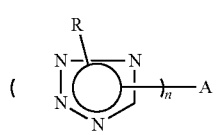

(I)

wherein
A is an organic group covalently bound to n tetrazoles,
n is an integer from 2 to 10;
each of the n tetrazoles is bound to A in position 2 or 5 and is respectively substituted in position 5 or 2 with a R group selected, independently for each tetrazole, from: $C_3$-$C_{10}$ linear or branched alkyl, $C_6$-$C_{20}$ aryl, $C_3$-$C_{10}$ cycloalkyl, monocyclic or bicyclic heterocyclyl, saturated, unsaturated or aromatic, with 5- or 6-member rings comprising at least one heteroatom selected from N, S, and O, optionally benzocondensed, being R in turn possibly substituted with at least one electron withdrawing group X or one electron donor group Y,
the polytetrazole cross-linking agent (C) having a molecular weight lower than 10000 g/mol, and
from 0 to 20 phr of a vulcanising agent (D).

2. The composition according to claim 1, wherein the polytetrazole cross-linking agent (C) is an oligomer with a molecular weight lower than 8000 g/mole.

3. The composition according to claim 1, wherein the polytetrazole cross-linking agent (C) has a molecular weight lower than 1500 g/mole.

4. The composition according to claim 3, wherein the polytetrazole cross-linking agent (C) has a molecular weight lower than 1000 g/mole.

5. The composition according to claim 1, wherein n is an integer from 2 to 4.

6. The composition according to claim 1, wherein the polytetrazole cross-linking agent (C) has an activation temperature of not less than 100° C. and not greater than 220° C.

7. The composition according to claim 6, wherein the polytetrazole cross-linking agent (C) has an activation temperature of not less than 120° C. and not greater than 200° C.

8. The composition according to claim 1, wherein the vulcanizing agent (D) is present in an amount of at least 0.2 phr of the vulcanising agent (D).

9. The composition according to claim 8, wherein the vulcanising agent (D) is chosen from sulphur, bis[(trialkoxysilyl)propyl]polysulphides, and mixtures thereof.

10. The composition according to claim 1, wherein the at least one polytetrazole crossing linking agent (C) of formula (I) is present in an amount ranging from 0.5 phr to 30 phr.

11. The composition according to claim 10, wherein the at least one polytetrazole crossing linking agent (C) of formula (I) is present in an amount ranging from from 1 phr to 20 phr.

12. The composition according to claim 1, wherein the compound of formula (I-A) has two tetrazoles substituted with the same substituent R.

13. An elastomeric compound for tyres, green or at least partially cross-linked, obtained by mixing and optionally cross-linking the elastomeric composition according to claim 1.

14. A component of a tyre for vehicle wheels, comprising an elastomeric compound, green or at least partially cross-linked, according to claim 13.

15. The component according to claim 14, wherein the component is chosen from tread band, under-layer, anti-abrasive layer, sidewall, sidewall insert, mini-sidewall, liner, under-liner, rubber layers, bead filler, bead reinforcing layers (flipper), bead protection layers (chafer), and sheet.

16. A tyre for vehicle wheels comprising at least one component of the tyre according to claim 14.

17. A tyre for vehicle wheels comprising at least one component of the tyre according to claim 15.

18. The tyre according to claim 16, wherein the tyre is for high performance vehicles (HP, SUV and UHP).

19. A process for preparing an elastomeric compound, comprising:
  i) mixing, in one or more steps, the elastomeric composition according to claim 1 keeping the elastomeric composition at a temperature at a value (T1) lower than a minimum activation temperature of the at least one polytetrazole cross-linking agent (C), to give a compound (I) comprising an unreacted polytetrazole cross-linking agent (C), and
  ii) optionally, heating the compound (I) to a temperature (T2) at least equal to or higher than the minimum activation temperature of the polytetrazole cross-linking agent (C), to give a compound (II) wherein the at least one polytetrazole cross-linking agent (C) has partially or completely reacted with double bonds of the diene elastomeric polymer (A).

20. The process according to claim 19, wherein T1 is at least 10° C. lower than the minimum activation temperature of the at least one polytetrazole cross-linking agent (C).

* * * * *